(12) United States Patent
Bernard et al.

(10) Patent No.: US 12,493,916 B2
(45) Date of Patent: *Dec. 9, 2025

(54) COLLECTION OF TRANSACTION RECEIPTS USING AN ONLINE CONTENT MANAGEMENT SERVICE

(71) Applicant: Dropbox, Inc., San Francisco, CA (US)

(72) Inventors: Daniel Bernard, San Francisco, CA (US); Eric Feng, San Francisco, CA (US); Marty Hu, San Francisco, CA (US); Veronica Zheng, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/466,364

(22) Filed: Sep. 13, 2023

(65) Prior Publication Data

US 2023/0419416 A1    Dec. 28, 2023

Related U.S. Application Data

(60) Continuation of application No. 17/208,239, filed on Mar. 22, 2021, now Pat. No. 11,769,216, which is a division of application No. 14/635,976, filed on Mar. 2, 2015, now Pat. No. 11,004,154.

(51) Int. Cl.
*G06Q 40/12*    (2023.01)
*H04L 51/08*    (2022.01)

(52) U.S. Cl.
CPC .......... *G06Q 40/12* (2013.12); *H04L 51/08* (2013.01)

(58) Field of Classification Search
None
See application file for complete search history.

(56) References Cited

U.S. PATENT DOCUMENTS

| | | | |
|---|---|---|---|
| 8,370,464 B1 | 2/2013 | Chitilian et al. | |
| 8,392,288 B1 | 3/2013 | Miller et al. | |
| 2009/0006239 A1 | 1/2009 | Robinson et al. | |
| 2013/0054613 A1* | 2/2013 | Bishop | G06F 16/93 707/E17.046 |

(Continued)

FOREIGN PATENT DOCUMENTS

| | | |
|---|---|---|
| AU | 2003203764 B2 | 2/2010 |
| CN | 102144242 A | 8/2011 |

(Continued)

OTHER PUBLICATIONS

Advisory Action for U.S. Appl. No. 17/208,239, mailed on Mar. 9, 2023, 3 pages.

(Continued)

*Primary Examiner* — Ariel J Yu
(74) *Attorney, Agent, or Firm* — Polsinelli PC

(57) ABSTRACT

An online content management service can collect and store receipts for a user from a variety of sources, including images captured by the user, messages received for the user at a messaging service or message management service, and/or receipts directly uploaded to the online content management service by a merchant. In the case of receipts provided as messages, a user can interact with a message management service to identify messages as receipts, and the message management service can upload such messages to the online content management service.

20 Claims, 13 Drawing Sheets

(56) References Cited

U.S. PATENT DOCUMENTS

2014/0195361 A1 7/2014 Murphy et al.
2015/0288627 A1 10/2015 Rowe et al.

FOREIGN PATENT DOCUMENTS

| CN | 103428321 A | | 12/2013 | | |
| --- | --- | --- | --- | --- | --- |
| CN | 103744981 A | * | 4/2014 | ........... | G06F 16/353 |
| WO | WO-2013048709 A1 | * | 4/2013 | ............. | H04L 51/22 |

OTHER PUBLICATIONS

Alexander, "Add incoming 'Receipts' to a Receipt Spreadsheet (w/first Attachment)," IFTTT, Sep. 7, 2012, retrieved from https://ifttt.comrecipes55686-add-incoming-receipts-to-a-receipt-spreadsheet-w-first-attachment on Mar. 19, 2015, 1 page.
Benpettit, "Save All Your Gmail Attachments to Dropbox," IFTTT, Jun. 20, 2013, retrieved from https://ifttt.comrecipes99959-save-all-your-gmail-attachments-to-dropbox on Mar. 19, 2015, 1 page.
Dachis A, "One Receipt Tracks Both Your Online and Offline Purchases in One Convenient Location," (Lifehacker), Dec. 6, 2011, retrieved from https://lifehacker.com/onereceipt-tracks-both-your-online-and-offline-purchase-5865345, on Mar. 19, 2015, 7 pages.
Digital First, "Review: Shoebox vs Receipt Bank and Why they Fall Short," Mar. 21, 2014, retrieved from https://digitalfirst.com/review-shoeboxed-vs-receipt-bank-fall-short/, on Mar. 19, 2015, 16 pages.
Final Office Action from U.S. Appl. No. 17/208,239, mailed Dec. 29, 2022, 15 pages.
Fitzpatrick A., "Google's Amazing New Email App Is Missing This 1 Feature," Time Magazine, Oct. 29, 2014, retrieved from http://time.com/3545587/google-inbox-review/ on Mar. 19, 2015, 3 pages.
Makeuseof, "Scan & Manage Your Receipts, Save Space, Paper Time," 2014, retrieved from: http://www.makeuseof.com/tag/scan-manage-receipts-save-space-paper-time/ on Mar. 19, 2015, 9 pages.
McAllister S., "Pilki Organizes and Uploads Receipts From Your Phone," Lifehacker, Mar. 17, 2013, retrieved from http://lifehacker.com/5990896/piikki-organizes-and-uploads-your-receipts on Mar. 19, 2015, 4 pages.
Non-Final Office Action from U.S. Appl. No. 17/208,239, mailed Jul. 26, 2022, 12 pages.
Notice of Allowance from U.S. Appl. No. 14/635,976, mailed Jan. 28, 2021, 8 pages.
Notice of Allowance from U.S. Appl. No. 17/208,239, mailed Jun. 22, 2023, 9 pages.
Pash A., "Slice is Brilliant Companion to Your Online Shopping," Lifehacker, Oct. 25, 2011, retrieved from http://lifehacker.com/5852564/slice-is-a-brilliant-companion-to-your-online-shopping on Mar. 19, 2015, 4 pages.
Pichai S., "An Inbox that Works for You," Official Gmail Blog, Oct. 22, 2014, retrieved from http://gmailblog.blogspot.com/2014/10/an-inbox-that-works-for-you.html on Mar. 19, 2015, 5 pages.
Sorrel C, "Pilkki Auto-Scans Receipts Into Evernote," Cult of Mac, Mar. 13, 2013, retrieved from https://www.cultofmac.com/219506/pikki-auto-scans-receipts-into-evernote/, on Mar. 19, 2015, 11 pages.
Velazco C., "OneReceipt Launches iOS App for Scanning and Storing Those Pesky Paper Receipt," Techcrunch, Apr. 11, 2012, retrieved from http://ftechcrunch.com/2012/04/11/onereceipt-launches-los-app-for-scanning-and-storing-those-pesky-paper-receipts on Mar. 19, 2015, 8 pages.
"What is Receipt Bank? How does Receipt Bank Work?," 2015, retrieved from http://www.srkaccounting.com/blogwhat-receipt-bank-how-does-receiptbank-work on Mar. 19, 2015, 2 pages.

* cited by examiner

702

- ✎ Compose
- 📥 Inbox ⌒706  53
- ⏱ Deferred  11
- ☰ Lists ⌒710
  - To Buy  4
  - To Read  5
  - 711⌒ Receipts  2
- ▶ Archive ⌒712
- ✖ Trash ⌒714
- ✉ Sent ⌒716

704 ↙

722  🔍 Search

SuperRide  _724a_  9:43 PM
Your Receipt – Tuesday ... 760a
January 16, 2015 $11.12. Thanks
for riding with SuperRide ...   [SAVE]

SuperRide  _724b_  11:07 AM
Your Receipt – Tuesday ... 760b
January 16, 2015 $10.75. Thanks
for riding with SuperRide ...   [SAVE]

Phil & Karen  _724c_  Yesterday
Font size not changing  ③
I found the problem; font setting should
now change when you use ...

Computer Co. Inc.  _724d_  Jan 8
Receipt for Store Purchase 760d
Thank you for shopping with us.
Your receipt is attached ....   [SAVE]

Nile Books ⌒726  _724e_  Jan 2
Save on Books You'll Love
This week only, save 50% on titles by  730
Franz Kafka & more ...

728⌒
732⌒
Nile Books  _724f_  Dec 30
Purchase Confirmation 760f
Your order dated December 30   [SAVE]
Items ordered Ship Date ....

720⌒

740
☰ 🕐 📧 ▶ ✖  ⌒750

Your Receipt – Tuesday 11 AM
SuperRide ⌒744              11:07 AM

SuperRide
Thanks for riding with SuperRide!

[map image]

From: Point A
Pickup 10:53 AM
To: Point B
Dropoff 11:06 AM
Car #321

Basic Fare      $8.00
Extras          $0.75
Surcharge       $0.00
Tip             $2.00
TOTAL       $10.75
*Charged to CC *****5678*
_748_

COLLECTION OF TRANSACTION RECEIPTS USING AN ONLINE CONTENT MANAGEMENT SERVICE

CROSS-REFERENCE TO RELATED APPLICATION INFORMATION

This application is a continuation of U.S. patent application Ser. No. 17/208,239, filed Mar. 22, 2021, which is a division of U.S. patent application Ser. No. 14/635,976, filed Mar. 2, 2015, now U.S. Pat. No. 11,004,154, issued May 11, 2021, which are incorporated herein by reference in their entireties.

BACKGROUND

This disclosure relates generally to online content management services and more particularly to collection of transaction receipts for a user using an online content management service.

Nearly every transaction involving the sale of goods or services by a merchant to a purchaser results in a receipt issued by the merchant to the purchaser to memorialize the transaction. Examples of information that can be memorialized in a receipt include a description of what was sold, the price paid, the merchant's name and contact information, the payment instrument (cash, credit card, etc.), the date of the transaction, and so on. Receipts can be useful to the purchaser for many purposes, such as facilitating return or exchange of defective or unwanted goods, proving that a purchase was made (e.g., for a rebate or warranty), reconciling with bank statements or other records, documenting expenses for reimbursement and/or tax deductions, and so on. Receipts can be issued in various formats, including paper and electronic formats. Over a period of time, a single individual can amass a disparate collection of receipts, which can make it difficult for the user to retain useful receipts or to find a specific receipt.

SUMMARY

Certain embodiments of the present invention relate to collecting and storing receipts using an online content management service. The online content management service can receive a user's receipts as well as other types of content item belonging to the user from various sources. Upon receipt of a content item, the online content management service can analyze the content item to determine whether it is a receipt. If so, the online content management service can automatically file the receipt, e.g., within a receipts folder maintained for the user. In some embodiments, the receipts folder can be structured to facilitate locating a particular receipt. For example, receipts can be organized into subfolders based on the merchant.

A number of different sources can be used, alone or in combination, to provide receipts to the online content management service. For example, in some embodiments, a user can create an image of a receipt (e.g., by taking a photo or using a scanner) and upload the image as an image data file to the online content management service. Upon receiving the newly uploaded image data file, the online content management service can analyze the image data to determine that it is an image of a receipt. Based on this determination, the online content management service can automatically file the image data file within the receipts folder.

As another example, in some embodiments, a merchant may provide a receipt to a user in the form of an electronic message (e.g., an email message), which can be delivered to a messaging service or message management service with which the user maintains an account. The messaging service or message management service can determine whether a particular message received for the user includes a receipt. If the message includes a receipt, the message management service can automatically provide a representation of the message (or just the receipt portion of the message) to the online content management service, assuming that the user's message management service account has been linked to the user's account with the online content management service. In some embodiments, rules for whether to automatically provide receipts to the online content management service can be established by the user, e.g., on a per-merchant basis. For instance, the message management service can identify messages that are candidates for processing as a receipt (e.g., messages that are likely to be or to include receipts). Such identification can be based on various elements that may be present in the message, such as the word "receipt" in the subject line, a particular sender identifier (e.g., corresponding to a known merchant), an arrangement of content elements suggestive of a receipt, or the like, and these elements can be used to define a triggering condition for a suggested rule. The message management service can send the message to a client device together with metadata indicating that the message is a candidate for processing as a receipt. The metadata can also include information about the suggested rule (e.g., the triggering condition). The client device can generate a user interface that includes a control operable by the user to indicate that the message should be processed as a receipt. If the user operates the control, the user interface can provide a further prompt to which the user can respond to indicate whether the suggested rule should be established as a rule. The client device can report the user's input(s) to the message management service, and the message management service can respond to the input(s), e.g., by processing the message as a receipt. Processing the message as a receipt can include providing a representation of the message to the online content management service to be filed in a receipts folder for the user, moving the message to a designated receipts message collection within the user's messaging-service account, and so on. If the user chooses to establish a rule, the message management service can automatically process future messages that satisfy the triggering condition as receipts.

As still another example, in some embodiments, a merchant may partner with an online content management service to provide an automated receipt delivery service. A user of the online content management service can choose to subscribe to automated receipt delivery. The online content management service can provide, to its merchant partners, selected information about users who have subscribed to automated receipt delivery, such as a user identifier and an authorization token generated by the online content management service for delivery of receipts for the user. When the user makes a purchase from a merchant partner, the merchant partner can determine the user identifier, e.g., based on information provided by the user at the point of sale or maintained by the merchant partner in its own customer database. The merchant partner can use the user identifier and the associated authorization token to upload the receipt directly to the online content management service.

The following detailed description together with the accompanying drawings will provide a better understanding of the nature and advantages of the present invention.

BRIEF DESCRIPTION OF THE DRAWINGS

FIG. 7 shows an example of a user interface screen according to an embodiment of the present invention.

FIG. 9 shows another example of a user interface screen according to an embodiment of the present invention.

DETAILED DESCRIPTION

Certain embodiments of the present invention relate to collecting and storing receipts using an online content management service. The online content management service can receive a user's receipts as well as other types of content item belonging to the user from various sources. Upon receipt of a content item, the online content management service can analyze the content item to determine whether it is a receipt. If so, the online content management service can automatically file the receipt, e.g., within a receipts folder maintained for the user. In some embodiments, the receipts folder can be structured to facilitate locating a particular receipt. For example, receipts can be organized into subfolders based on the merchant.

A number of different sources can be used, alone or in combination, to provide receipts to the online content management service. For example, in some embodiments, the user can capture an image of a receipt and upload the image to the online content management service. As another example, in some embodiments, the user may receive receipts via a messaging service (e.g., email service). The messaging service or an intermediary message management service can automatically identify certain messages as candidates for processing as receipts and/or automatically process certain messages as receipts; processing a message as a receipt can include providing a representation of the message to the online content management service. As yet another example, in some embodiments, a merchant partner may be authorized to directly upload receipts for certain users to the online content management service. Other sources can also provide receipts to the online content management service, and all receipts, regardless of source, can be conveniently filed within the receipts folder maintained for the user.

Figure 1:
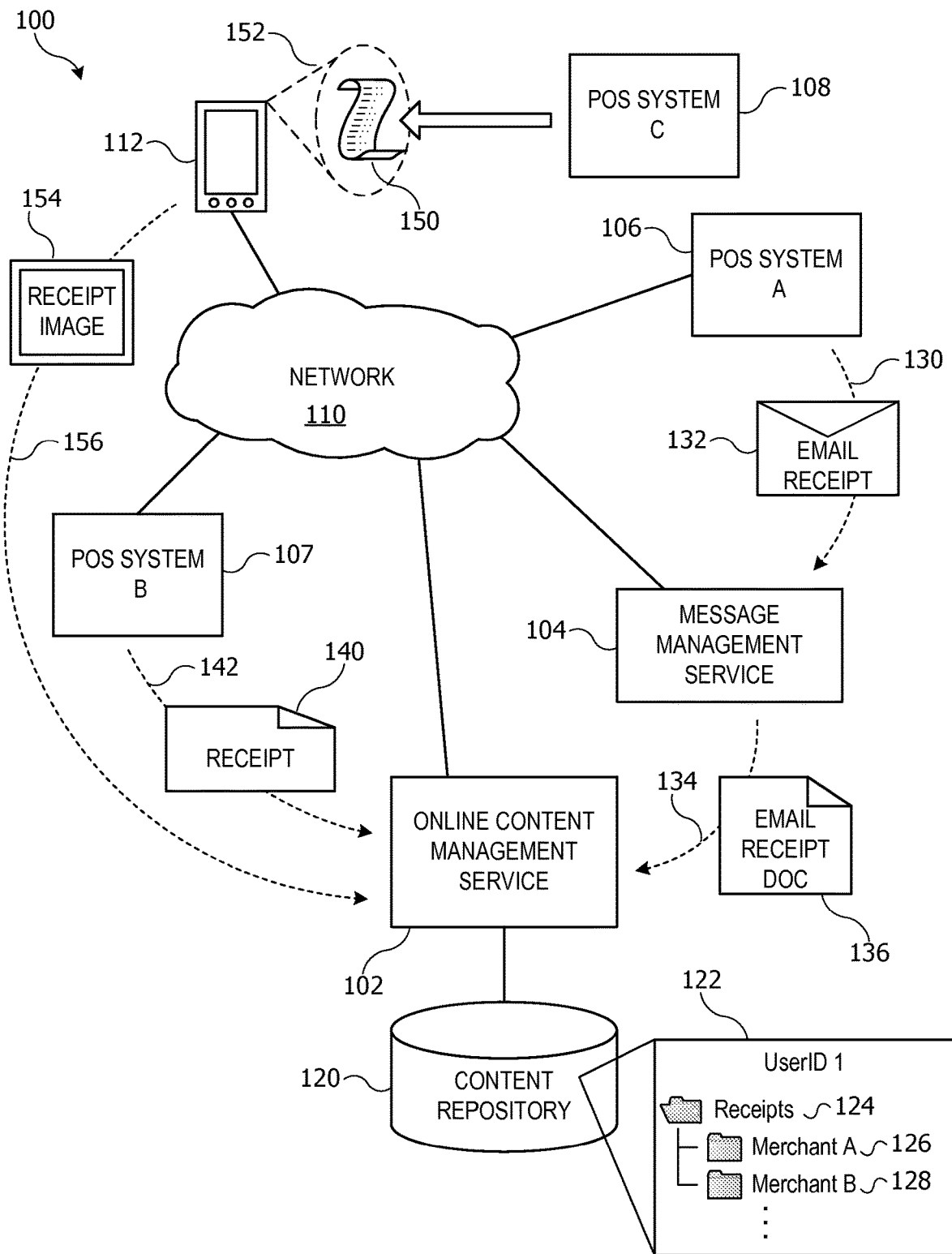
FIG. 1 shows a block diagram of a communication system according to an embodiment of the present invention.

FIG. 1 shows a block diagram of a communication system 100 according to an embodiment of the present invention. Communication system 100 can include online content management service 102, message management service 104, and various point-of-sale ("POS") systems 106, 107, 108. Online content management service 102, message management service 104, and at least one of POS systems 106-108 can be connected via a network 110 (which can be a wide-area network such as the Internet). Also connected to network 110 can be one or more client devices 112 that can be operated by a user to interact with online content management service 102 and message management service 104 via network 110. In some embodiments, client device 112 may also be able to interact directly with POS systems 106-108, e.g., via short-range communication when client 112 is physically present in a store or other environment where one of POS systems 106-108 is operating.

Online content management service 102 can include, for example, a file storage service, a file sharing service, a social media service that allows users to post messages and/or other content, and so on. Online content management service 102 can communicate with a content repository 120. Online content management service 102 can be hosted on servers maintained by a service provider and accessed via network 110. In some embodiments, content repository 120 can include storage space to store content items that have been uploaded or otherwise provided to online content management service 102 by or on behalf of a user, as well as a database, filesystem, or other information management system to facilitate access to the stored content items. Any type of content items can be stored, including text documents, images, documents readable using specific application software (e.g., PDF documents, word processing documents, spreadsheets, etc.), media items (e.g., audio and/or video), messages (e.g., email or text messages), documents in a markup language (e.g., HTML documents), and so on.

In embodiments described herein, the stored content items can include receipts. As used herein, the term "receipt" (or "transaction receipt") refers generally to a content item that includes information descriptive of a particular purchase transaction, where a "purchase transaction" can include any exchange of money for goods and/or services of any kind between a purchaser and a "merchant" (which can be any person or entity that provides goods and/or services). In some instances, services purchased can include temporary access rights to some item of the merchant's property (e.g., renting a car or movie). The descriptive information for a purchase transaction can include, e.g., an identifier of the merchant, date of transaction, price paid, nature of goods and/or services purchased, payment media used, an identifier of the purchaser, etc. The information can be represented in any format, including, e.g., an image, an HTML document, a PDF document, a text document, etc. The amount of information in a particular receipt and the format in which the information is presented can be varied as desired.

Online content management service 102 can store receipts in an organized manner, e.g., using a folder model as shown in inset 122, which shows that for a particular user ("UserID 1"), a "Receipts" folder 124 is maintained. Within Receipts folder 124 can be subfolders 126, 128 for receipts for transactions between the user and specific merchants. The term "folder" is used herein to refer generally to an organizational paradigm for storing content items (e.g., as data files) that allows a user to group related content items and view established groups of content items (e.g., using a browser-type interface).

Message management service 104 can be any service that allows users to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. In some embodiments, message management service 104 can act as a proxy or intermediary between one or more messaging services (e.g., an email service such as such as Gmail™ (a service of Google Inc.) or Yahoo!® Mail (a service of Yahoo! Inc.)) and client 112. A proxy or intermediary message management service 104 can provide enhanced functionality for organizing, storing, accessing, composing, and/or responding to messages stored by one or more messaging services. One example of message management service 104 can be the Mailbox service of Dropbox, Inc.

Client 112 can be a user-operated computing device that can execute software to interact with online content management service 102 and/or message management service 104. Various types of computing devices can be used, including desktop computers, laptop computers, tablet computers, smart phones, wearable computing devices, personal digital assistants, and so on. Software can be provided, e.g., as an application program (or "app") executable on client 112 or via a general-purpose application such as a web browser that can be used to access a website that allows users to access online content management service 102 and/or message management service 104. Client 112 can be said to "belong to" a particular user, such as the owner of client 112 or a user who has used client 112 to log into an account maintained for the user at online content management service 102 and/or message management service 104.

A given user can have accounts with both online content management service 102 and message management service 104. The user's account with message management service 104 can be linked to the user's account with online content management service 102, allowing message management service 104 to deliver particular content items (e.g., receipts) received as messages to online content management service 102. Examples are described below.

Various merchants can maintain POS systems 106-108. As used herein, a "POS system" can include any computer-based or mechanical or other system that is operated by a merchant for purposes of processing and recording a transaction. Examples include retail checkout stands; handheld devices that may be equipped with bar-code readers, magnetic-stripe readers, near-field communication (NFC) transceivers, or the like; and other devices. POS systems 106-108 can include any systems capable of capturing information about a purchase transaction, such as the particular goods and/or services that were purchased, the cost of the services, payments made, payment instrument used (e.g., cash, credit card, payment service), identifier of the merchant, and so on, and further capable of generating a receipt for the transaction. Some POS systems 106, 107 can be "online" systems that are connected to network 110. POS system 108 is an example of an "offline" system that is not connected to network 110. It is to be understood that any number of POS systems can be used in connection with embodiments of the present invention, and different POS systems can be of different types. A POS system can be used for any type of transaction, including in-person transactions (e.g., purchases made in a store or personally from the merchant) and/or online transactions (e.g., purchases made via a merchant's website).

In this example, POS system 106 can be capable of generating email receipts. As used herein, an "email receipt" can include any email message that contains transaction-receipt information in the body of the message and/or as an attachment. For instance, when a user makes a purchase using POS system 106, the user can be prompted to provide an email address, and the receipt can be sent to that email address. In some instances, POS system 106 can be linked to a customer database that is able to look up the user's email address from other information provided by the user (e.g., a phone number, credit card number, loyalty-program membership number, etc.).

As indicated by dashed line 130, email receipt 132 can be sent (e.g., via network 110) to the user's account at message management service 104. Message management service 104 can recognize email receipt 132 as containing transaction-receipt information. As indicated by dashed line 134, message management service 104 can upload (e.g., via network 110) email receipt document 136, which can include a representation of the transaction-receipt information to online content management service 102 on behalf of the user. Email receipt document 136 can be formatted as an email message (e.g., identical to email receipt 132) or in another format (e.g., as an HTML document, PDF document, text document, etc.). Thus, online content management service 102 can collect email receipts for a user. Specific examples of email receipt processing by a message management service such as message management service 104 are described below. While email is used as an example, it is to be understood that receipts can be delivered using other types of messaging and formats.

POS system 107 can be capable of delivering receipts to online content management service 102 without processing by the user or an intermediary service such as message management service 104. For example, a provider of online content management service 102 can partner with various merchants, referred to herein as "merchant partners." A merchant partner can be any merchant to which the provider of online content management service 102 has agreed to provide access credentials (also referred to as authorization tokens) that will allow the merchant partner to upload receipt documents for users of online content management service 102. When a user makes a purchase at POS system 107, POS system 107 can obtain user identifying information, determine the corresponding access credentials, and upload (e.g., via network 110) a receipt 140 to online content management service 102 for the user, as indicated by dashed line 142. Thus, online content management service 102 can collect receipts for a user "directly" from the merchant. (In this context, "directly" indicates that the collection of a receipt from the merchant can occur without any processing of the receipt by the user or an intermediary service.) Specific examples of direct collection of receipts from a merchant partner are described below.

POS system 108 can be capable of generating paper receipts 150. In various embodiments, POS system 108 might or might not have a connection to network 110. To upload paper receipt 150, a user can capture an image 154 (e.g., a digital image in any format) of paper receipt 150, e.g., using client device 112 as indicated by dashed lines 152. For example, if client device 112 includes a camera, the user can take a photo of paper receipt 150. If client device 112 includes a scanner, the user can scan paper receipt 150. Client device 112 can upload (e.g., via network 110) receipt image 154 to online content management service 102, as indicated by dashed line 156. It is to be understood that other devices can also be used to capture and/or upload a receipt image; in some instances, a user can operate a first device (e.g., a scanner or camera) to capture the image, then transfer the image to a second device (e.g., a computer with an Internet connection) that is capable of communicating with online content management service 102. As described below, in some embodiments, it is not necessary for the user to identify receipt image 154 as being a receipt. Instead, online content management service 102 can analyze received images and automatically identify those that are images of receipts. Specific examples of processing receipt images are described below.

It will be appreciated that communication system 100 is illustrative and that variations and modifications are possible. Any number of different merchants and/or point-of-sale systems may participate, and online content management service 102 can collect receipts for a user via any combination of supported collection channels (e.g., email receipts, direct uploading, and/or receipt images). Communication among the various systems and/or devices can take place via a network such as the Internet. In some instances, a private network or virtual private network can be used.

Figure 2:
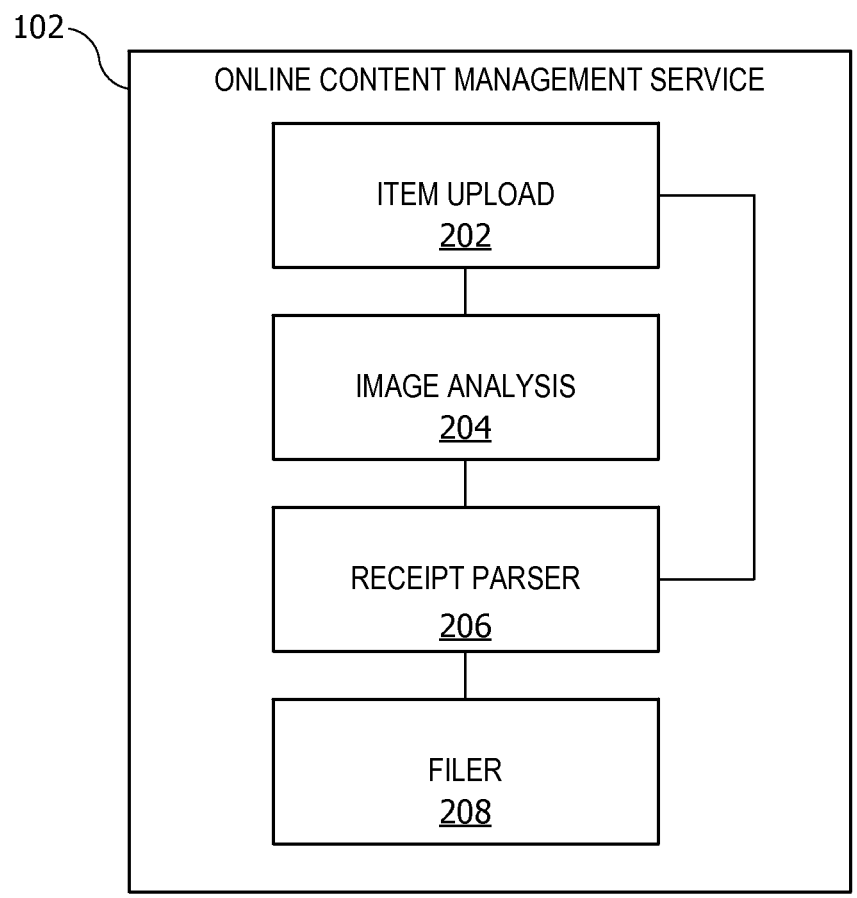
FIG. 2 shows a block diagram of processing modules for an online content management service according to an embodiment of the present invention.

FIG. 2 shows a block diagram of processing modules that can be implemented in online content management service 102 according to an embodiment of the present invention. The processing modules can be implemented, e.g., as program code executing on suitable programmable processors.

Item upload module 202 can provide a communication interface to receive uploaded content items for a user. In some instances, a content item can be uploaded based on an express user instruction. For instance, the user may operate client device 112 of FIG. 1 to execute a client application provided by the provider of online content management service 102. The client application can provide a user interface via which the user can select a particular content item stored on client device 112 and initiate an upload of the content item to online content management service 102. (As used herein, "upload" refers generally to the transfer of a content item from a source device to online content management service 102.) In other instances, uploading of a content item can happen automatically. For example, client device 112 may be configured (e.g., by the user) to automatically synchronize some or all of its stored content items with online content management service 102. As another example, in some embodiments, the user may be able to configure client device 112 (or an app executing thereon) to automatically upload certain types of new content items, such as photos taken using a camera of client device 112, to online content management service 102. Further, in some embodiments, third-party entities (e.g., any entity other than the user's device(s)) can upload content items for the user. For example, as shown in FIG. 1, message management service 104 can upload email receipt document 136 for a user, and POS system 107 can upload receipt 140 for a user.

Upon receiving an uploaded content item, item upload module 202 can verify that the upload has been authorized by the user. For example, in the case of an upload from client device 112, item upload module 202 can verify that client device 112 is logged in to the user's account at online content management service 102 and/or that a particular app on client device 112 that initiated the upload is linked to the user's account at online content management service 102. In the case of an upload from a third-party entity (e.g., message management service 104 and/or POS system 107), item upload module 202 can receive a user identifier and authorization token from the third-party entity, and this information can be used to verify that the upload has been authorized; examples are described below.

Assuming the upload has been authorized, item upload module 202 can dispatch the uploaded item for further processing. For example, item upload module 202 can determine whether the uploaded item is an image. Items that are images can be dispatched to image analysis module 204. If the uploaded item is not an image, item upload module 202 can determine whether the item is a receipt. This determination can be based on the source of the uploaded item (e.g., uploaded content items received from POS system 107 for a user can be assumed to be receipts) or information provided by the source (e.g., message management service 104 may specifically indicate whether an uploaded content item is a receipt or some other type of content). If item upload module 202 determines that a particular content item is a receipt, item upload module 202 can dispatch the content item directly to receipt parser module 206. If the content item is not a receipt and not an image, then item upload module 202 can dispatch the content item to one or more other processing modules (not shown) that can perform various processing operations unrelated to collection of receipts. Such processing can result in storing or filing of the content item in a folder other than the receipts folder.

Image analysis module 204 can analyze a received image to determine whether it is a receipt image. For example, receipt images may have a distinctive format or may include specific text that can be recognized through image analysis. In some embodiments, image analysis module 204 can implement a probabilistic classifier to generate a score reflecting a probability that a particular image is an image of a receipt, and a determination as to whether an image is a receipt image can be based on the score. In some embodiments, image analysis module 204 can perform additional processing on images that it identifies as receipt images to extract additional information. For example, image analysis module 204 can employ pattern recognition to identify a name or logo of the merchant within the receipt image. For images identified as receipt images, image analysis module 204 can provide the receipt image (and any additional information extracted from the image) to receipt parser 208. For images not identified as receipt images, image analysis module 204 can dispatch the image to one or more other processing modules (not shown) that can perform processing operations unrelated to collection of receipts. Such processing can result in storing or filing of the image in a folder other than the receipts folder.

Receipt parser module 206 can receive items identified as receipts from item upload module 202 and/or image analysis module 204. Receipt parser module 206 can perform additional operations such as determining a merchant name from the receipt (in some cases, this may already have been done by item upload module 202 and/or image analysis module 204) and/or performing further analysis to confirm that the content item is a receipt. Receipt parser module 206 can deliver content items that are receipts to filer module 208. Filer module 208 can file the receipt within a receipts folder maintained for the user (e.g., receipts folder 124 of FIG. 1). In some embodiments, filer module 208 can automatically create a receipts folder for the user if the user does not already have one. In some embodiments, filer module 208 can create subfolders within the receipts folder, e.g., based on merchant name as shown in FIG. 1, and can file the receipt in the appropriate subfolder.

Figure 3:
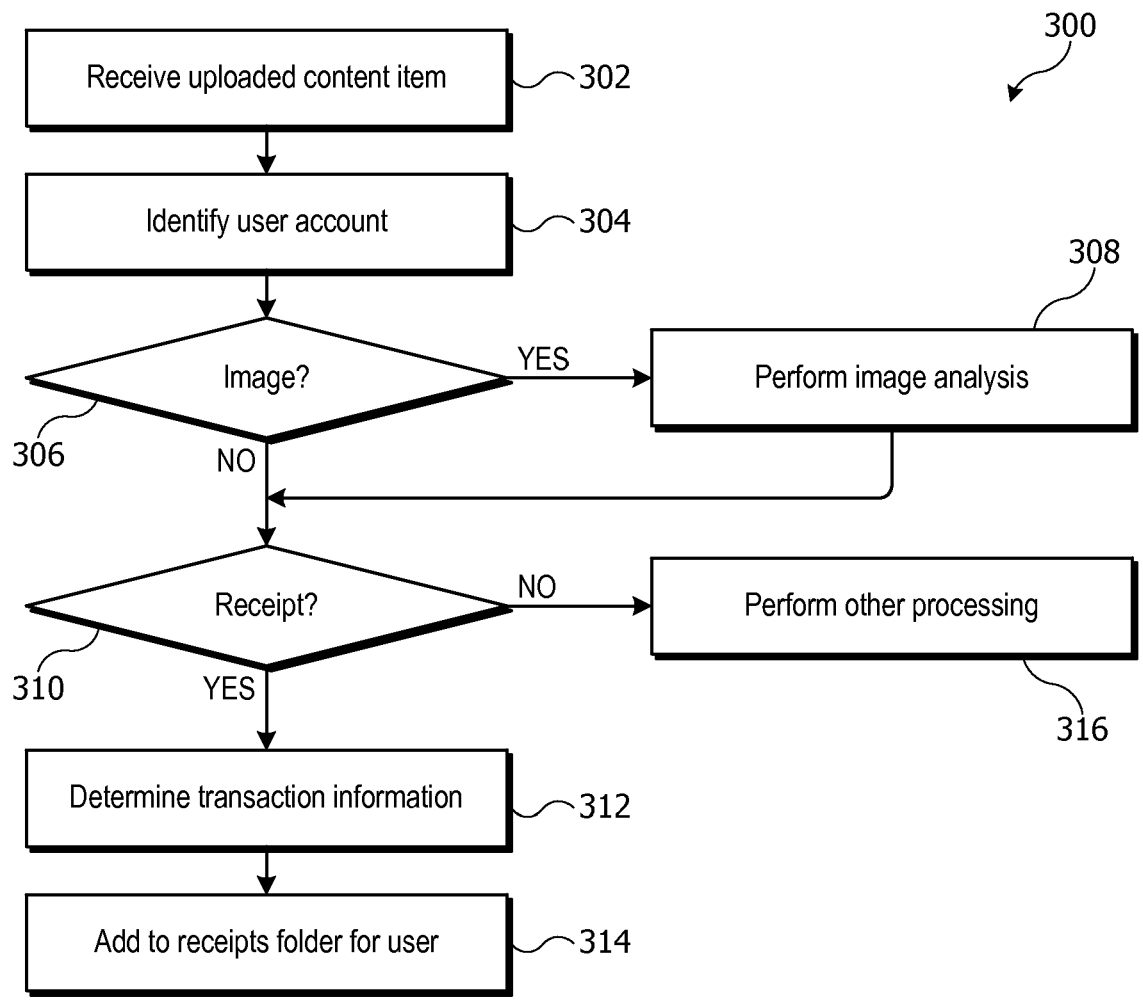
FIG. 3 shows a flow diagram of a process for handling an uploaded content item according to an embodiment of the present invention.

A further understanding of the operation of the modules shown in FIG. 2 can be had by reference to FIG. 3, which shows a flow diagram of a process 300 for handling an uploaded content item according to an embodiment of the present invention. Process 300 can be implemented, e.g., in online content management service 102 using the modules of FIG. 2.

At block 302, process 300 can receive an uploaded content item from a source. For example, referring to FIG. 1, any of message management service 104, POS systems 106-108, and/or client 112 can be a source for an uploaded content item. As described above, the uploaded content item can be received by item upload module 202. At block 304, process 300 can identify a user account in which the uploaded content item is to be stored. For example, the uploaded content item can be accompanied by information usable by item upload module 202 to identify the user account to which the item is being uploaded; as described above the identification of the user account can be based on the source (e.g., a client device or app that is logged into or linked to a particular user's account), an authorization token provided by the source, a user identifier provided by the source, or other information as desired. In some embodiments, identifying the user account can include verifying that the source is authorized to upload content items to the user account. If the source is not authorized, then process 300 can end.

At block 306, process 300 can determine whether the content item is an image. The determination can be based, e.g., on whether the data format or file format of the content item corresponds to a recognized image data format. Examples of recognized image data formats can include JPEG, GIF, bitmap formats, PDF, and so on. If the content item is an image, then at block 308, process 300 can perform image analysis, e.g., using image analysis module 204 as described above.

At block 310, process 300 can determine whether the content item is to be treated as a receipt. As described above, the determination can be based on the source of the uploaded content item, information provided by the source, and/or information determined by online content management service 102 by analyzing the content item (e.g., results of image analysis at block 308). If the content item is to be treated as a receipt, then at block 312, process 300 can determine transaction information for the receipt, such as the merchant name, e.g., using receipt parser module 206 as described above. At block 314, the receipt can be added to the receipts folder for the user, e.g., using filer module 208 as described above.

If, at block 310, the content item is not to be treated as a receipt, then other processing operations can be performed at block 316; such operations can include further classifying the content item, determining how to store the content item, and/or actually storing the content item. A detailed description of such operations is omitted.

It will be appreciated that the modules and processing operations of FIGS. 2 and 3 are illustrative and that varia-tions and modifications are possible. Process steps described as sequential may be executed in parallel, order of steps may be varied, and steps may be modified, combined, added or omitted. The level of analysis performed on a receipt can be varied as desired. For instance, other information can be extracted, such as transaction date and/or amount, and this information can be used in labeling and/or organizing receipts within the receipts folder. Further, the term "receipts folder" can be understood as including any organizational paradigm that supports logically grouping content items so that the user can access the content items by reference to the group; use of a particular filesystem or database is not required. Determining whether a content item is a receipt can be based on any information available about the content item. For example, a user may take a photo of a receipt before leaving the location of the transaction, and location information included in the photo (e.g., a geotag) may be used in evaluating the likelihood that the image is a receipt image and/or to facilitate identifying the merchant.

As described above, receipts can be uploaded to online content management service 102 via a number of different channels. One such channel includes receipt images uploaded from the user's devices, such as client device 112 of FIG. 1 uploading receipt image 154. It is to be understood that any device can be used to capture and/or upload a receipt image. The uploading can be initiated manually (e.g., the user can specifically direct client device 112 to upload a particular content item) or automatically (e.g., client device 112 can be configured to automatically upload all photos taken by a camera of client device 112). It is not necessary for the user or the uploading device to provide any indication identifying the receipt image as a receipt; online content management service 102 can identify receipt images using image analysis as described above. In some embodiments, a user or uploading device may be able to include a flag or other indicator with an uploaded content item to identify the item as a receipt image, and online content management service 102 can recognize the flag or other indicator if it is present.

Another channel for uploading receipts can include receipts sent as messages to the user and uploaded by a message management service (or messaging service) that receives the message. For instance, in the example described above, email receipt 132 can be recognized as such by message management service 104, and message management service 104 can automatically upload a corresponding email receipt document 136 to online content management service 102.

A specific example will now be described. In this example, message management service 104 acts as an intermediary between the user's client(s) and one or more messaging services. However, it is to be understood that a messaging service can also perform the message management operations described herein.

Figure 4:
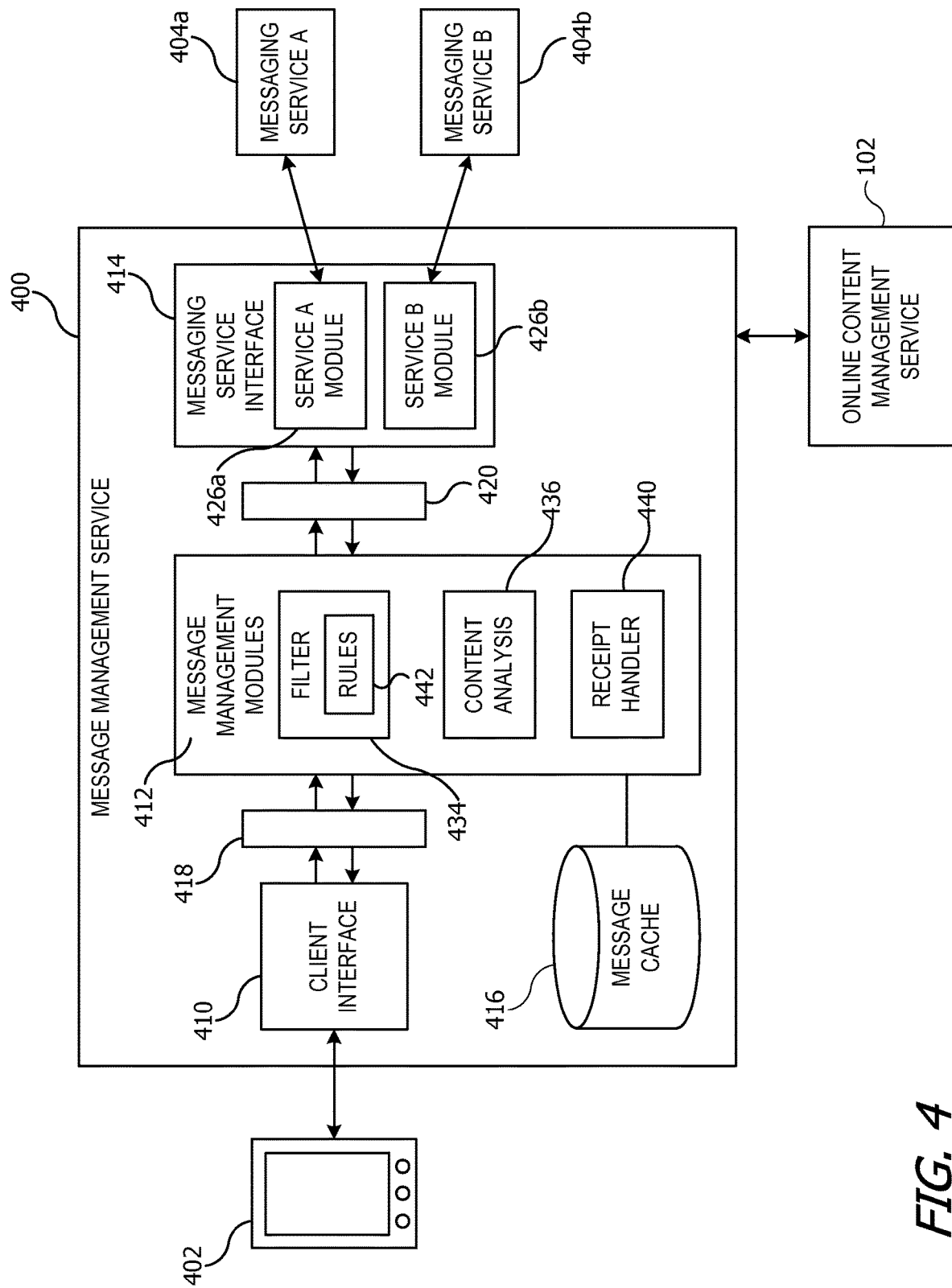
FIG. 4 shows a block diagram of a message management service according to an embodiment of the present invention.

FIG. 4 shows a block diagram of a message management service 400 according to an embodiment of the present invention. Message management service 400 can implement message management service 104 of FIG. 1. For example, message management service 400 can act as an intermediary between a client 402 (e.g., implementing client 112 of FIG. 1) and various messaging services 404a, 404b. Each messaging service 404a, 404b can be a different messaging service, such as different email services, an email service and a social network service, and so on. While two messaging services 404 are shown, any number of messaging services 404 can be supported by a single message management service 400.

Message management service 400 can include a client interface 410, message management modules 412, a messaging service interface 414, and a message cache 416. A client transfer layer 418 can provide transfer queues for transferring messages and other instructions and information between client interface 402 and message management modules 412, and a service transfer layer 420 can provide transfer queues for transferring messages and other instructions and information between message management modules 412 and messaging service interface 414.

Client interface 410 can communicate with multiple instances of client 402 (e.g., clients associated with different users and/or multiple clients associated with the same user). For instance, client interface 410 can deliver "inbound" messages from messaging services 404a, 404b to client 402, receive "outbound" messages from client 402, and/or receive various message processing instructions from client 402, such as instructions to defer a message, move a message to a list or folder, mark a message as read (or unread), delete a message, and so on. Such instructions can include instructions related to management of messages that are (or include) receipts, as described herein.

Message management modules 412 can include functional blocks or modules configured to perform various operations on messages received by message management service 400, including outbound messages received from client 402 as well as inbound messages received from messaging services 404a, 404b. For example, message management modules 412 can include filter module 434, content analysis module 436, and receipt handler 440.

Filter module 434 can apply filtering rules to inbound messages prior to delivery to the client. In some embodiments, filter module 434 can maintain a data store of established rules 442, where each rule specifies a "triggering" condition and a resulting action. The triggering condition can be specified, for instance, based on a feature or combination of features of the inbound message. In some embodiments, the triggering condition can be based on the sender of the message being a sender that the user has previously identified as a sender of messages that are (or include) receipts. Other features of the message can also be incorporated, such as content elements (e.g., presence of the word "receipt" in the subject line or body, arrangement of elements in a format characteristic of receipts, etc.). More generally, any feature of a message that is detectable by filter module 434 can be used to define a triggering condition, either individually or in combination with other message features. A resulting action specified by a rule can include any action a user might take with regard to a received message. For example, the rule might specify that the message should be processed as a receipt, e.g., by being moved to a receipts folder within the user's messaging account and/or uploaded as a receipt to online content management service 102. Other actions can also be specified. In some embodiments, established filtering rules 442 are applied to every new inbound message received for a particular user from any of messaging services 404a, 404b. Different sets of filtering rules 442 can be established for different users, providing a customized user experience. In some embodiments, filtering rules 442 can include per-sender rules that indicate that messages from certain senders should be processed as email receipts.

Content analysis module 436 can analyze content of inbound messages to identify messages that are candidates for processing as receipts. For example, content analysis module 436 can detect the presence of keywords (e.g., the word "receipt") in the subject line, body, or attachment of the message; an arrangement of content elements within the message or an attachment that is characteristic of receipts; a sender identifier (e.g., name or email address) that is known to a provider of message management service 400 as a sender of receipts; and/or other indicia indicating that a message is (or includes) a receipt.

Content analysis module 436 can provide each inbound message identified as a candidate for processing as a receipt to filter module 434, and filter module 434 can determine whether established rules 442 include a rule applicable to the message. If so, filter module 434 can apply the established rule. Examples of applying a rule are described below. If an established rule does not exist, filter module 434 can create a suggested rule to process the message as a receipt. Filter module 434 can add suggestion metadata (e.g., including the triggering condition and an indication that the message is a candidate for processing as a receipt) to the inbound message and provide the inbound message and the metadata to client interface 410 for delivery to client 404. Client 404 can extract the metadata, present the suggested rule to the user, obtain a response from the user, and report the response to message management service 400. If the user accepts the suggested rule, filter module 434 can add the suggested rule to established rules 442. Examples are described below.

Receipt handler 440 can implement processing of a message as a receipt. For example, if filter module 434 determines that an established rule exists to process a particular inbound message as a receipt, filter module 434 can provide the message to receipt handler 440. As another example, in some embodiments, client 404 can provide an instruction to message management service 400 to process a particular message as a receipt without establishing a rule regarding future messages, and receipt handler 440 can process such instructions. For instance, in some embodiments, receipt handler 440 can move a message identified as a receipt to a designated receipts folder in the user's messaging account. For example, receipt hander 440 can generate an instruction to move the message to the receipts folder and send the instruction via messaging service interface 414 to the one of messaging services 404a, 404b at which the message is stored. In addition or instead, receipt handler 440 can generate a receipt document corresponding to the message (or the receipt portion of the message, such as an attachment) and upload the receipt document to online content management service 102. In some embodiments, the user's account with message management service 104 can be linked to the user's account with online content management service 102 to facilitate the uploading. Linking of the accounts can include online content management service 102 providing a persistent authorization token for the user's account to message management service 104 (e.g., based on a user request to establish the link). Message management service 104 can include the authorization token with any request to upload content items, including receipt documents.

Messaging service interface 414 can include various service modules 426a, 426b, each of which can be configured to communicate with a different one of messaging services 404a, 404b. For example, different messaging services 404 may support different communication protocols for access by external clients (e.g., IMAP, POP, MAPI/Exchange, custom APIs, and so on), and each service module 426 can be configured to use the appropriate protocol for a particular messaging service 404.

In some embodiments, messaging service interface 414 can present itself to messaging services 404a, 404b as a client accessing functionality of messaging services 404a, 404b, so that the existence of message management service 400 can be transparent to messaging services 404a, 404b. For example, if messaging service 404a supports IMAP, service module 426a can establish a persistent IMAP connection to a user's account with messaging service 404a, allowing messaging service 404a to deliver any incoming messages or message updates it receives for the user's account to message management service 400. Similarly, message management service 400 can deliver any outbound messages or message updates it receives from client device 402 to messaging service 404a. Persistent connections to services other than IMAP can also be maintained, or messaging service interface 414 can periodically poll various messaging services 404 to obtain new messages. The persistent connection can be maintained regardless of whether a given user currently has any client 402 connected to client interface 410, and message management service 400 can maintain synchronization with messaging services 404. A particular client 402 can disconnect from message management service 400 at any time and can be resynchronized with message management service 400 whenever it reconnects to message management service 400.

Message cache 416 can be a database or other data store managed by message management service 400 that provides storage and retrieval of messages. For example, messages can be stored and retrieved by reference to internal message identifiers assigned to each message by message management service 400 and/or messaging services 404. Message management service 400 can use message cache 416 to store copies of messages that are likely to be of interest to a client, such as recently received messages or messages found in a user-initiated search.

Messaging services such as messaging service 404a can maintain their own message stores or repositories independently of any action by message management service 400. In some embodiments, messaging service 404a can maintain a primary (or "master") store of messages for a user that can include all messages currently associated with that user's account with messaging service 404a (e.g., including sent messages, received messages, archived messages, etc.), and message cache 416 can store a subset of the user's messages (also referred to as a "window" of messages) as well as partial information about additional messages in the primary store that are not currently replicated in message cache 416. If client 402 requests a message that is not presently stored in message cache 416, message management service 400 can retrieve the message from the appropriate messaging service 404 and deliver it to client 402.

In operation, message management service 400 can obtain inbound messages from messaging services 404 and provide the messages to client 402. Message management service 400 can also receive outbound messages (e.g., messages to be sent) from client 402 and provide the messages to messaging service 404 for delivery to the recipient(s). Message management service 400 can also receive message update requests (including action requests and requests to establish a rule as described herein) from client 402 and can provide corresponding instructions to messaging service 404, e.g., to mark messages as read or unread, move a message to a folder, apply or remove a message tag, delete a message, and so on. Message management modules 412 can perform various operations on inbound and/or outbound messages, examples of which are described below. In some instances, these operations can be performed on all messages, regardless of which messaging service 404 is the source of a particular message.

It will be appreciated that message management service 400 is illustrative and that variations and modifications are possible. For example, other message management modules and/or operations can be provided, such as the ability to defer messages for later review and/or response, tag messages, search messages, and so on. In some embodiments, message management can include windowing (selecting and immediately delivering to a client a fixed number of messages deemed likely to be relevant, such as the 50 or 100 or some other number of most recent messages), backfilling (populating message cache 416 with messages in anticipation of client requests), message format conversion (e.g., converting between a message format used by a messaging service and a format optimized for display on a client), management of message folders or streams, message sorting, management of attachments, synchronization with messaging services 404 (e.g., relaying instructions from client 402 to move or modify messages) and so on.

Message management service 400 can operate to, among other things, identify inbound messages that are candidates for processing as receipts, receive action requests from the user regarding messages identified as candidates for processing as receipts (e.g., to process a single message as a receipt or to establish a rule to process messages meeting a specific triggering condition as receipts), and perform the requested actions (e.g., processing messages as receipts).

Figure 5:
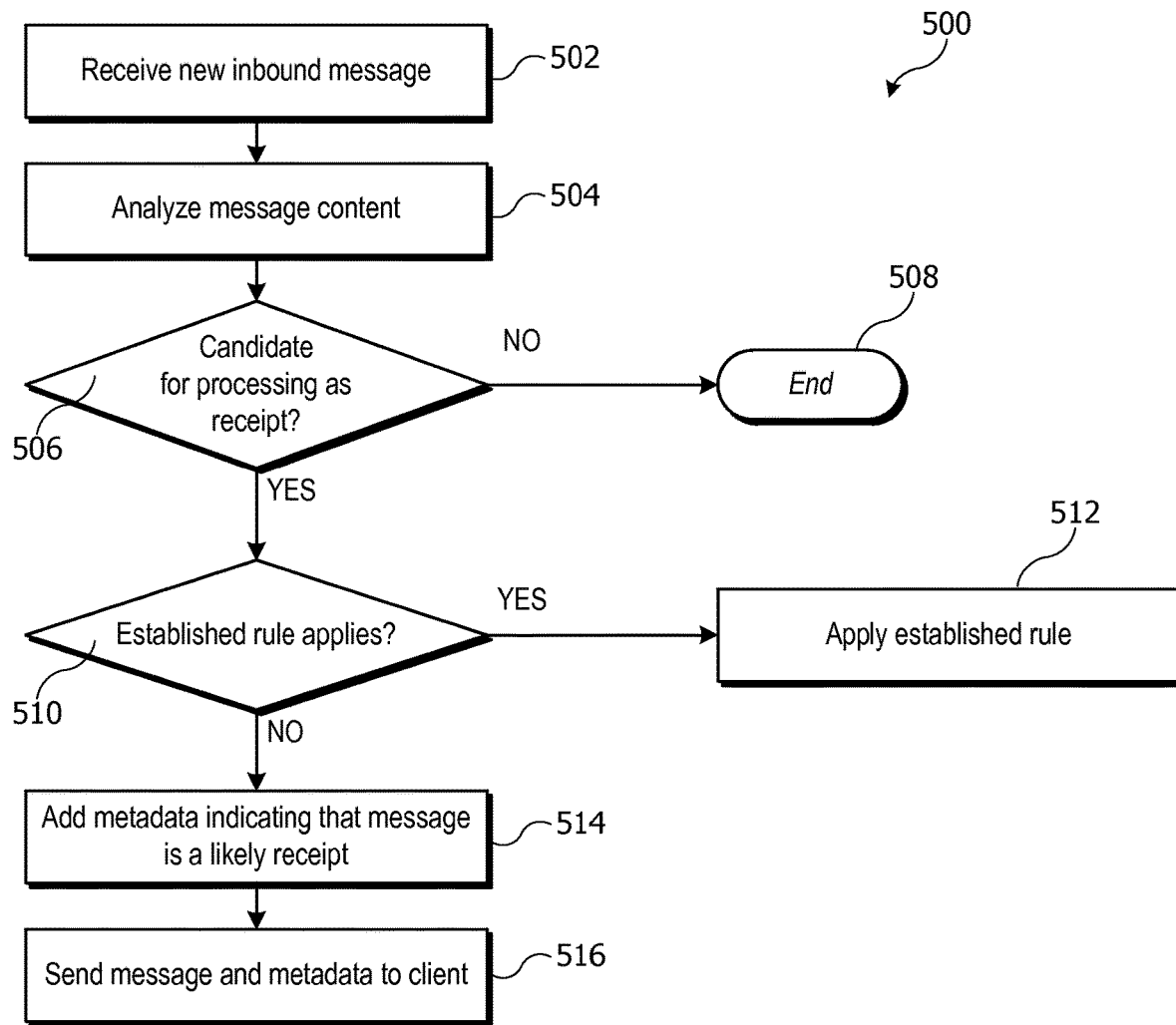
FIG. 5 shows a flow diagram of a process for processing a new inbound message according to an embodiment of the present invention.

FIG. 5 shows a flow diagram of a process 500 for processing a new inbound message according to an embodiment of the present invention. Process 500 can be implemented, e.g., in message management service 400 of FIG. 4 (or message management service 104 of FIG. 1).

At block 502, process 500 can receive a new inbound message for a user. For instance, messaging service interface 414 can receive a new message from messaging service 404a. For present purposes, a message can be considered "new" if this is the first time the message has been received at message management service 400.

At block 504, process 500 can analyze the message content. For instance, content analysis module 436 can analyze the message content to determine whether it is a candidate for processing as a receipt. Various types of content analysis can be used. The analysis can be based on a sender identifier (e.g., name and/or address of the sender); presence of particular keywords (e.g., "receipt") in the message subject, message body, and/or attachments; particular patterns in the content of the message or an attachment (e.g., patterns of monetary amounts and text); and so on. In some embodiments, a probabilistic classifier can be used to assign a score reflecting the probability that the message is (or includes) a receipt. In some embodiments, content analysis module 436 can be informed by information about past patterns of user behavior. For example, if a user has repeatedly moved messages similar to the message under analysis to a receipts folder, this may indicate increased likelihood that the message under analysis is (or includes) a receipt.

At block 506, process 500 can determine whether the message a candidate for processing as a receipt. For example, in some embodiments, content analysis module 436 may provide a binary (yes or no) identification of the message as either a receipt or non-receipt. In other embodiments, content analysis module 436 can provide a score, and the determination at block 506 can be based on a threshold criterion applied to the score. For messages that are not identified as candidates for processing as receipts, process 500 can end at block 508. It is to be understood that message management service 400 can perform other processing on such messages, and such processing can ultimately result in delivery of such messages to client 402.

If, at block 506, the message is identified as a candidate for processing as a receipt, then at block 510, process 500 can determine whether an established receipt-processing rule applies to the message. For example, the message can be provided to filter module 434, which can compare characteristics of the message to the triggering conditions for various established rules 442. In some embodiments, a rule for processing receipts can use a sender identifier as a triggering condition; other triggering conditions can also be defined, such as sender identifier in conjunction with particular keywords in the message (e.g., "receipt"). If the message characteristics match a triggering condition for an established rule 442, then at block 512, process 500 can apply the established rule. For example, the established rule can indicate that the message is to be moved to a receipts folder and/or uploaded to online content management service 102. In some embodiments, receipt handler 410 can perform these operations.

If, at block 510, no established rule applies, then at block 514, process 500 can add metadata to the message indicating that the message is a candidate for processing as a receipt. The metadata can also include a triggering condition for a suggested rule to process future similar messages as receipts; the triggering condition can include the information that resulted in identifying the message as a candidate for processing as a receipt. At block 516, the message and the metadata can be sent to client 402.

Client 402 can present messages to the user, including messages identified as candidates for processing as receipts. For each message identified as a candidate for processing as a receipt, client 402 can prompt the user to indicate whether the message should be processed as a receipt. Depending on the user's response, client 402 can send an appropriate action request (or message update instruction) to message management service 400.

Figure 6:
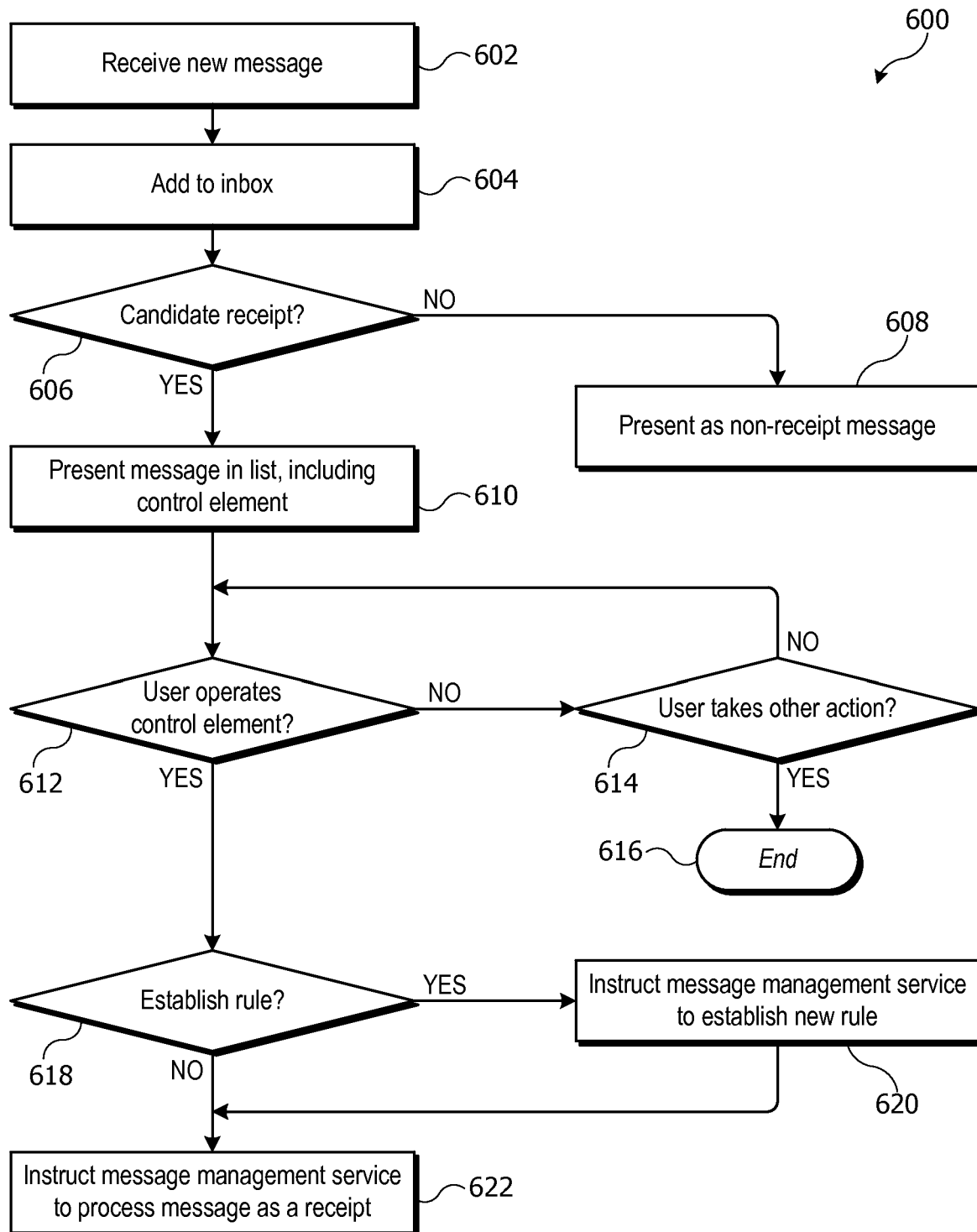
FIG. 6 shows a flow diagram of a process for presenting messages to a user according to an embodiment of the present invention.

FIG. 6 shows a flow diagram of a process 600 for presenting messages to a user according to an embodiment of the present invention. Process 600 can be implemented, e.g., in client 402 of FIG. 4.

At block 602, process 600 can receive a new message from message management service 400. At block 604, process 600 can add the new message to an inbox for the user. As used herein, an "inbox" can be a default collection of received messages that the user has not yet acted upon (e.g., by moving them to another message collection or deleting them). At block 606, process 600 can determine whether the new message is a candidate for processing as a receipt. For example, process 600 can rely on metadata added during execution of process 500 described above. If the message is not a candidate for processing as a receipt, then the message can be presented as a non-receipt message at block 608. If the message is a candidate for processing as a receipt, a receipt, then at block 610, process 600 can present the message and a control element operable by the user to indicate that the message should be processed as a receipt.

FIG. 7 shows an example of a user interface screen 700 according to an embodiment of the present invention, with messages and associated control elements for messages that are candidates for processing as receipts. Screen 700 can include several panes of information. Left pane 702 can provide a listing of message collections 704. Message collections 704 can include an inbox 706 for messages that have been received for the user and are awaiting user action. Other message collections 704 can include messages that have been assigned to that collection 704 by the user or by operation of an established rule. For example, a "deferred" message collection 708 can include messages for which the user has indicated that action should be deferred until a later time. "Lists" collection 710 can include various lists that the user or a messaging service or a message management service (e.g., messaging service 404a, 404b or message management service 400 of FIG. 4) has defined to organize messages for which further attention is needed. In this example, lists collection 710 can include a "receipts" collection 711 to which messages that are (or contain) receipts can be moved as described herein. "Archive" collection 712 can include messages on which action has been completed. "Trash" collection 714 can include messages that are ready to be deleted. "Sent" collection 716 can include messages that the user has sent to others. Collections 702 shown in FIG. 7 are intended as examples, and other collections can also be provided in addition to or instead of those shown. In some embodiments, a user can select one of collections 704 as a "current" collection to view, e.g., by operating a pointing device to move a cursor 720 over the name of the collection in left pane 702 and "clicking" to select the collection or by touching the name of the collection on a touch-screen display. A visual highlight (e.g., boldface font) or other indicator can be used to identify the current collection.

Center pane 722 can be a list area that displays a list of messages 724a-f from the current collection. In this example, the current collection is the inbox, and messages 724a-f are represented. For each message, e.g., message 724e, the list entry in center pane 722 can include selected message information, such as a sender 726, a subject line 728, a date/time 730 indicating when the message was sent or received, and a preview portion 732 of the message content. In some embodiments, the list can be thread-based, with an initial message and one or more reply messages represented by a single list entry. The number of messages (or threads) presented in center pane 722 can be determined dynamically and can be based on considerations such as the available space on the display, the user's preference as to font size, and the number of messages 724 in current collection 704. If the number of messages in current collection 704 exceeds the available space, center pane 722 can be scrollable to allow the user to view additional messages. If the available space exceeds the number of messages in current collection 704, white space can be presented, e.g., at the bottom of center pane 722. In some embodiments, a visual indicator can be shown at the bottom of the list to allow the user to recognize that there are no further messages in the collection. Users can interact with messages in center pane 722. For instance, a user can select a message (or thread) to view, e.g., by moving cursor 720 over the message and clicking or by touching the message entry on a touch screen. As another example, the user can move a message (or thread) from the current collection to a different ("destination") collection.

Right pane 740 can be used to display a message selected from center pane 722. In this example, a subject line 742, sender 744, time stamp 746, and message body 748 are shown. If message body 748 is too large to fit within pane 740, pane 740 (or a portion thereof) can be scrollable to allow the user to view different portions of message body 748. In some embodiments, right pane 740 can provide a "conversation" view of related messages, such as a thread of messages, in which all or part of the body of several different messages is presented. Right pane 740 can also include control elements 750 operable to move the current message (or conversation in the case of a conversation view) to a different collection. Each of control elements 750 can correspond to a different collection (e.g., any of the collections 704 shown in left pane 702).

For each message that has been identified as a candidate for processing as a receipt, the corresponding message representation 724*a*, 724*b*, 724*d*, 724*f* in center pane 722 can include a selectable "save" control element 760*a*, 760*b*, 760*d*, 760*f*. The presence of control element 760 can act as a prompt to the user to indicate a desire to process the message as a receipt. The user can operate any control element 760, e.g., by positioning cursor 720 over a specific control element 760 and clicking or by touching control element 760 on a touchscreen display.

Referring again to FIG. 6, after presenting the message and the user-operable control element (e.g., as shown in FIG. 7), at block 612, process 600 can determine whether the user has operated the control element. If the user does not operate the control element, then at block 614, process 600 can determine whether the user has taken a different action on the message (e.g., any action that moves the message out of the inbox collection). If the user takes a different action, process 600 can end at block 616. Thus, process 600 can wait at blocks 612 and 614 until the user either operates the control element or takes a different action on the message.

Figure 8:
FIG. 8 shows another example of a user interface screen according to an embodiment of the present invention.

If, at block 612, the user operates the control element, then at block 618, process 600 can determine whether to establish a receipt-processing rule for similar messages that may be received in the future. For example, FIG. 8 shows user interface screen 700 of FIG. 7 after the user has selected "save" control element 760*b*. A pop-up dialog box 802 can be displayed, asking the user whether to establish a rule and indicating the suggested triggering condition; in this case, the suggested rule would save all messages from sender "SuperRide" to an online content management service ("OCMS"). The user can select "Once" control 804 to indicate that this message should be saved to the online content management service without establishing a rule or "Always" control 806 to indicate that this message should be saved to the online content management service and a rule should also be established. In some embodiments, the user can cancel the entire operation, e.g., by clicking while cursor 720 is positioned outside pop-up dialog box 802. (In the context of process 600, this action can be treated as the user not accepting the prompt at block 612.) In some embodiments, the user may have the option to edit the suggested triggering condition prior to indicating that the rule should be established.

Referring again to FIG. 6, in some embodiments, the determination at block 618 as to whether to establish a rule can be based on the user's response to pop-up dialog box 802 of FIG. 8. If it is determined that a rule should be established, then at block 620, process 600 can instruct message management service 400 to establish a new rule, e.g., by sending an action request to message management service 400. The instruction to establish a new rule can include the triggering condition from the suggestion metadata (or the triggering condition as edited by the user if applicable). At block 622, process 600 can instruct message management service 400 to process the message as a receipt, e.g., by sending an action request to message management service 400. In some embodiments, the instruction to create a rule and the instruction to process the message as a receipt can be combined into a single instruction, e.g., a single action request.

Figure 9:
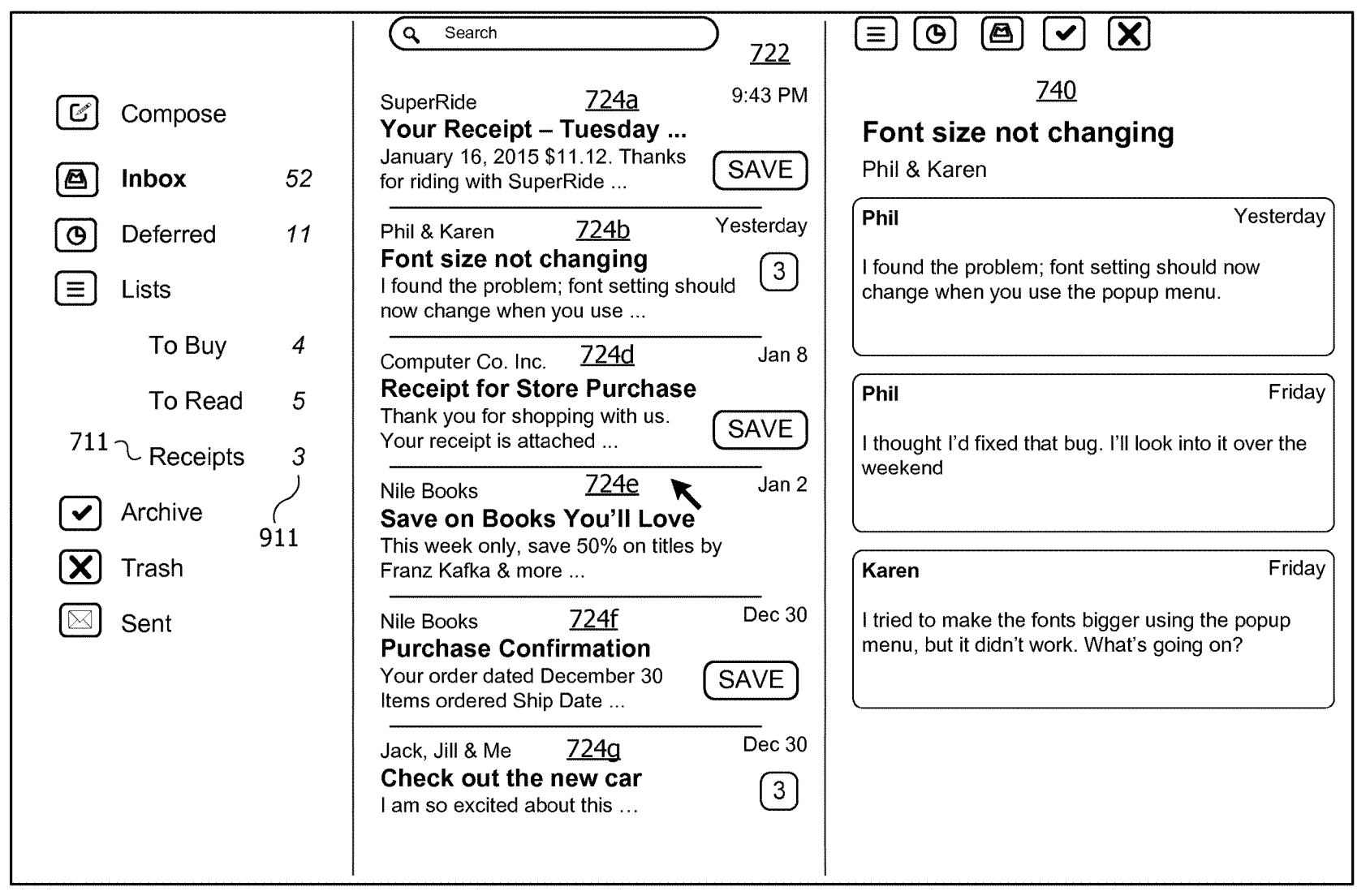

In some embodiments, at or after block 622, process 600 can update the user interface screen to indicate that the message has been saved as a receipt. It should be understood that the user interface can be updated in advance of the message management service completing its processing of the message as a receipt. FIG. 9 shows user interface screen 700 of FIG. 7 after the user has saved message 724*b* as a receipt. In this example, message 724*b* has been removed from center pane 722, and counter 911 associated with receipts collection 711 has been incremented to indicate that a message has been added to receipts collection 711. Messages 724*c-f* have moved up, and a previously unseen message 724*g* now appears at the bottom of the message list. In addition, right pane 740, which was previously displaying content of message 724*b* now displays content of a different message, in this case message 724*c*.

Figure 10:
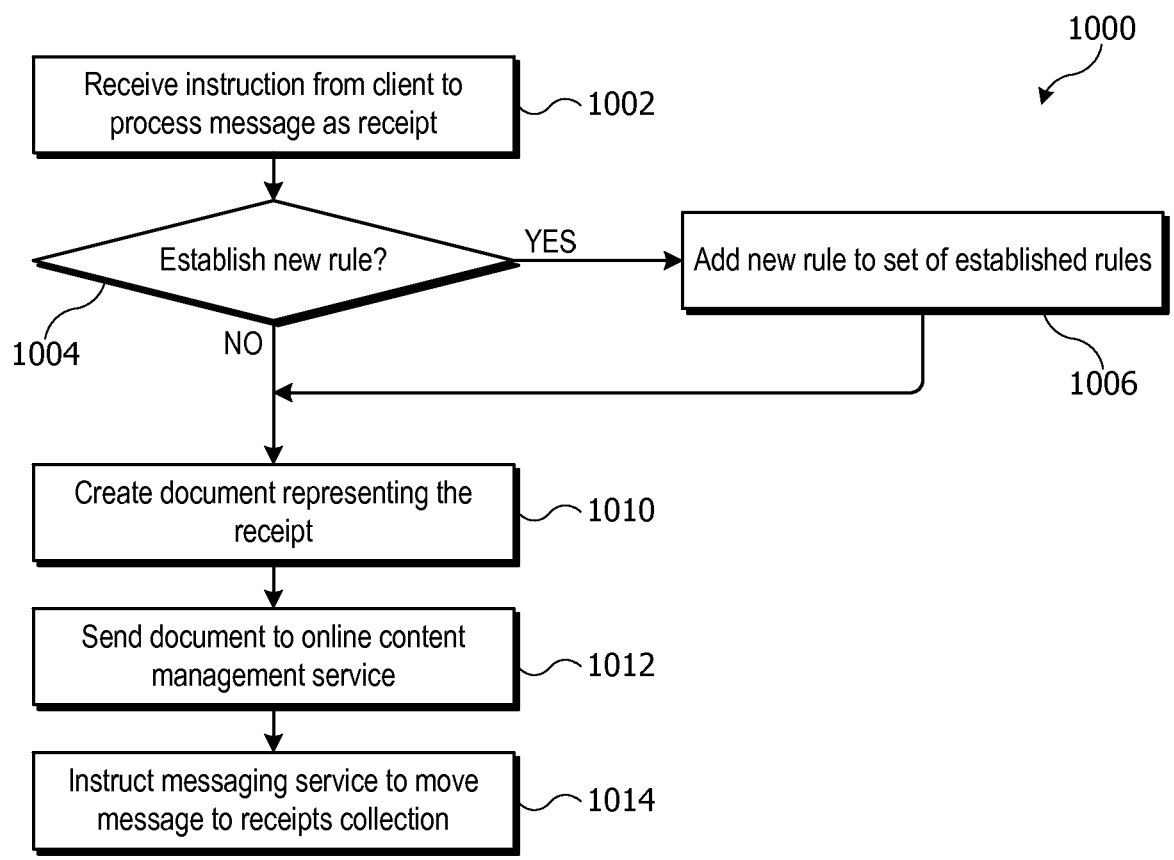
FIG. 10 shows a flow diagram of a process for processing a message as a receipt according to an embodiment of the present invention.

The instruction to process a message as a receipt and, if applicable, to create a new rule, can be received by message management service 400. FIG. 10 shows a flow diagram of a process 1000 for processing a message as a receipt according to an embodiment of the present invention. Process 1000 can be implemented, e.g., in message management service 400 of FIG. 4.

At block 1002, process 1000 can receive an instruction from a client (e.g., client 402) to process a message as a receipt. In some embodiments, the instruction can be generated in accordance with process 600 described above.

At block 1004, process 1000 can determine whether a new rule is to be established. For example, as described above, the instruction from the client can indicate whether to establish a new rule or just process a single message as a receipt. If a new rule is to be established, then at block 1006, process 1000 can add the new rule to established rules 442. Thereafter, the rule can automatically be applied to new inbound messages so that future messages that satisfy the triggering condition can be automatically processed as receipts (e.g., by operation of process 500 of FIG. 5).

Regardless of whether a rule is created, process 1000 can act on the instruction to process the message as a receipt. At block 1010, process 1000 can create a document representing at least the receipt portion of the message. For instance, if receipt information is in the body of the message, process 1000 can create an HTML document representing the message body. If receipt information is in an attachment to the message, process 1000 can extract the attachment from the message and use the attachment as the document representing the receipt. At block 1012, process 100 can send (e.g., upload) the document representing the receipt to online content management service 102. At block 1014, process 1000 can instruct the messaging service that received the message for the user (e.g., messaging service 404*a*) to move the message to a receipts collection.

It will be appreciated that the foregoing examples of email receipt processing systems and methods are illustrative and that variations and modifications are possible. Process steps described as sequential may be executed in parallel, order of steps may be varied, and steps may be modified, combined, added or omitted. Additional functionality can also be supported. For instance, if the user chooses to create a rule, the user can be further prompted to apply the rule to messages that are already in the inbox.

User interfaces can be varied and can include more or fewer information panes than the examples shown. For instance, on a mobile device with a relatively small screen, just one pane at a time might be made visible. The particular arrangement and appearance of elements in various panes (including user-operable control elements) can also be modified as desired.

The complexity of rules for automatically processing email receipts can be varied as desired. For example, a triggering condition for processing a message as a receipt can be based on the sender identifier, message content, message formatting, or any combination thereof. In some embodiments, the metadata included with a message identified as a candidate for processing as a receipt can include a specific triggering condition for a suggested new rule. The client can present the specific triggering condition to the user. For instance, in the example of FIG. 8, the triggering condition is that the message is from sender "SuperRide." If the user accepts the suggestion to establish a rule, the instruction to the message management service can include the specific triggering condition that was accepted. As noted above, in some embodiments the user may have the option to edit the triggering condition prior to accepting a suggested new rule.

In some embodiments, in addition to or instead of emailing receipts to users (or, more generally, sending messages to users that are (or include) receipts), a merchant can directly upload a receipt to online content management service 102. For instance, as described above, POS system 107 can upload receipt 140 to online content management service 102.

Figure 11:
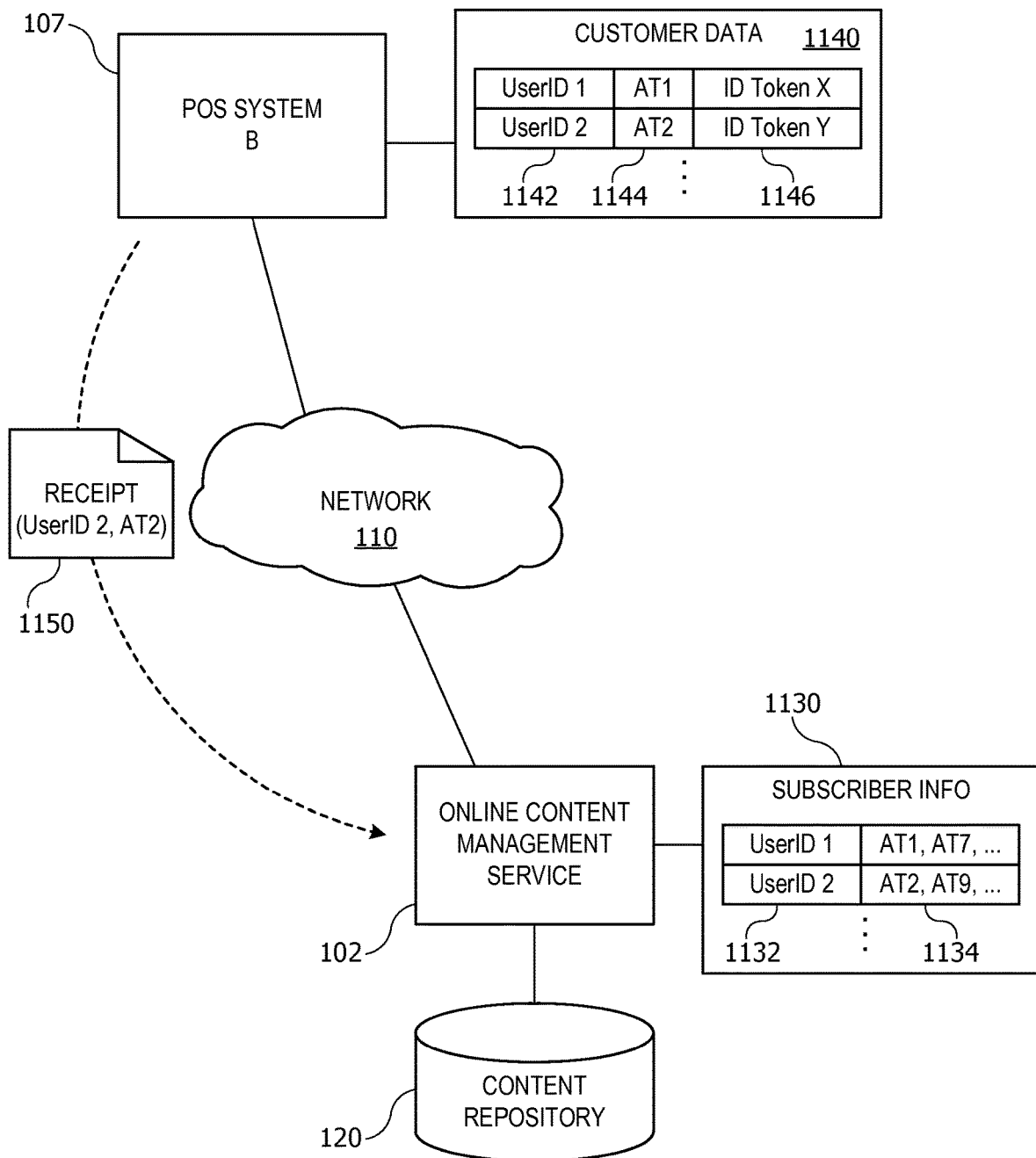
FIG. 11 shows a block diagram of a system that supports direct uploading of receipts to online content management service by a merchant partner according to an embodiment of the present invention.

By way of further illustration, FIG. 11 shows a system block diagram with additional details related to direct uploading of receipts to online content management service 102 by POS system 107 according to an embodiment of the present invention. In this example, the merchant who operates POS system 107 can be a merchant partner of online content management service 102. Accordingly, the provider of online content management service 102 has provided access credentials for at least some of the users of online content management service 102 to the merchant who operates POS system 107.

For example, online content management service 102 can maintain subscriber information 1130 for users who have agreed to allow direct uploading of receipts by merchant partners. In some embodiments, direct uploading can be an enhanced service that users of online content management service 102 can choose to subscribe to or not. For each user who has subscribed, subscriber information 1130 can include a user identifier 1132 and a set of authorization tokens ("AT") 1134 generated by online content management service 102 for that user. In some embodiments, each subscribing user can be issued a single authorization token for use by all merchant partners. In other embodiments, online content management service 102 can generate different authorization tokens for the same user for use by different merchant partners.

POS system 107 can have access to customer data 1140. Customer data 1140 can include information about users who have made (or might make) purchases using POS system 107. For users who are subscribers to direct uploading of receipts, customer data 1140 can include a user identifier 1142, an authorization token 1144 for the user, and an identifying token 1146. User identifier 1142 can be the same as user identifier 1132. Authorization token 1144 can be one of authorization tokens 1134 generated for the user by online content management service 102. Identifying token 1146 can include any item of information that the user would ordinarily present while conducting transactions with POS system 107 and that is unique to the user relative to other purchasers who interact with POS system 107. For example, identifying token 1146 can include any or all of a credit card number, a phone number, a membership number for a loyalty/rewards program supported by the merchant, an email address, a username for an account the user maintains with the merchant (e.g., for online shopping), or the like. During a transaction, POS system 107 can receive an identifying token from the purchaser, match the identifying token to identifying token 1146 of a record in customer data 1140, and thereby determine the corresponding user identifier 1142 and authorization token 1144. POS system 107 can generate a receipt 1150 that incorporates user identifier 1142 and authorization token 1144 and can upload receipt 1150 directly to online content management service 102. (In this context, "directly" indicates that the collection of a receipt from the merchant can occur without any processing by the user or an intermediary service; the actual communication can take place via network 110.)

Online content management service 102 can process receipt 1150 in the manner described above. For example, online content management service 102 can compare the included user identifier 1142 and authorization token 1144 to subscriber information 1130 and verify that the user has authorized the upload, then perform additional receipt-processing actions as described above, including storing the receipt in content repository 120. In some embodiments, online content management service 102 can assume that any content item received for a user from a merchant partner is a receipt for a purchase by the user from that merchant partner.

Figure 12:
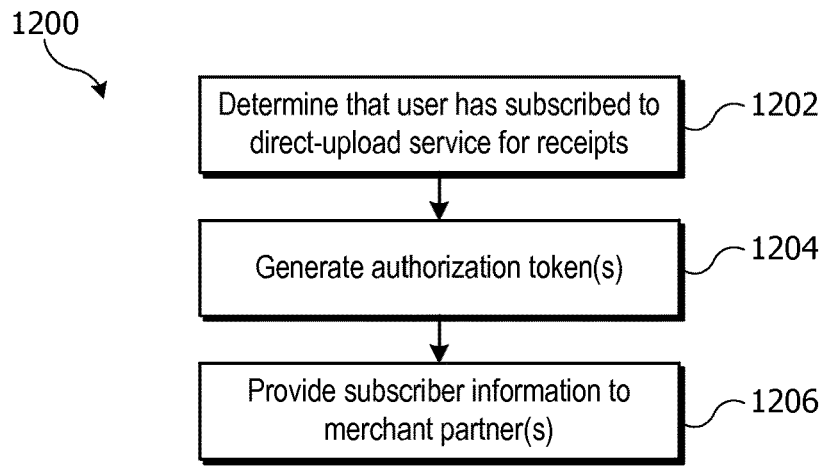
FIG. 12 shows a flow diagram of a process for establishing an authorization token for a user with a merchant partner according to an embodiment of the present invention.

A further understanding of the operation of the system shown in FIG. 11 can be had by reference to FIG. 12, which shows a flow diagram of a process 1200 for establishing an authorization token for a user with a merchant partner according to an embodiment of the present invention. Process 1200 can be performed, e.g., by online content management service 102.

At block 1202, process 1200 can determine that a user has subscribed to a direct uploading service for receipts. For example, online content management service 102 can provide (e.g., via a website) an account management interface via which users can configure their accounts with online content management service 102. The account management interface can include an option to subscribe to (or unsubscribe from) direct uploading of receipts, and the user can select either option and/or change the selection at any time. The determination at block 1202 can be based on the selected option.

At block 1204, process 1200 can generate one or more authorization tokens for the user. In some embodiments, a single authorization token can be used for all merchant partners. In other embodiments, different authorization tokens can be used for different merchant partners.

At block 1206, process 1200 can provide subscriber information to merchant partners of online content management service 102. As noted above, a "merchant partner" can be any merchant with which the provider of online content management service 102 has an agreement allowing the merchant partner to upload receipt documents for users of online content management service 102 (e.g., the merchant who operates POS system 107 of FIGS. 1 and 11). The subscriber information can include user identifiers and an authorization token for each subscribed user, as described above.

Figure 13:
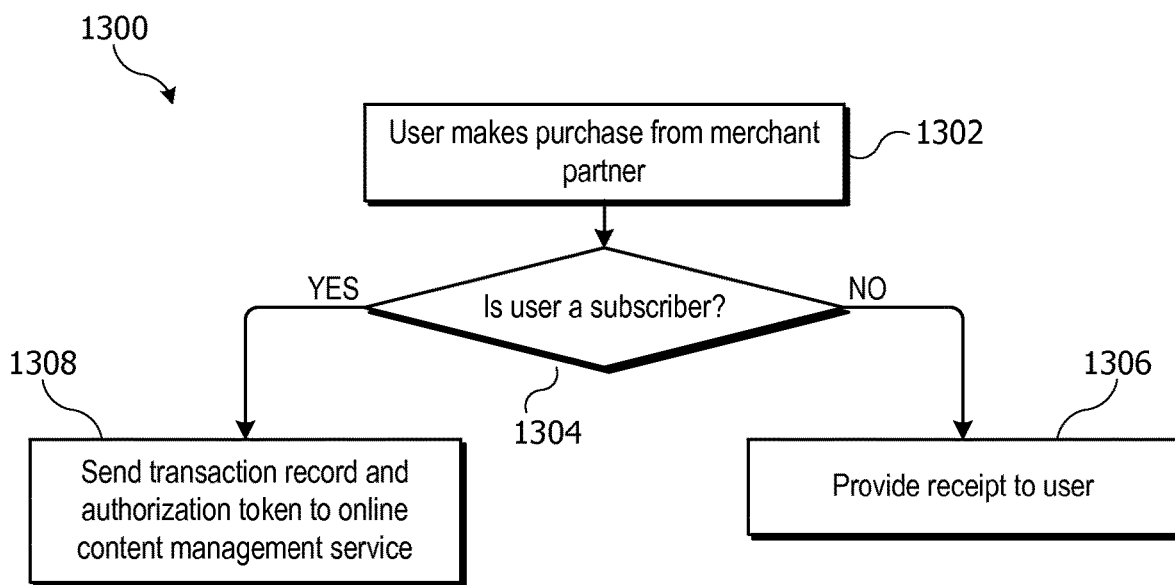
FIG. 13 shows a flow diagram of a process for directly uploading a receipt from a merchant partner according to an embodiment of the present invention.

Thereafter, the merchant partner who receives the subscriber information can directly upload receipts for subscribing users. FIG. 13 shows a flow diagram of a process 1300 for directly uploading a receipt according to an embodiment of the present invention. Process 1300 can be performed, e.g., by POS system 107.

At block 1302, a user can make a purchase from a merchant partner, e.g., the merchant who operates POS system 107. For example, POS system 107 can include a web server, cash register, or the like that provides a user interface. The user and/or a cashier can interact with the user interface to identify goods or services being purchased and/or to provide payment information.

At block 1304, process 1300 can determine whether the user is a subscriber to the direct-uploading service. For example, during the making of the purchase at block 1302, the user may provide an identifying token as described above, and POS system 107 can determine from the identifying token and customer information 1140 whether the user is a subscriber.

If the user is not a subscriber, then at block 1306, a receipt can be provided to the user, e.g., as a paper receipt, an email receipt, or the like. It should be understood that such receipts can be uploaded to online content management service 102, e.g., via processes described above.

If the user is a subscriber to the direct-uploading service, then at block 1308, process 1300 can send a transaction record (receipt) and authorization token to online content management service 102. For example, POS system 107 can extract authorization token 1144 for a subscribed user from customer information 1140. Other information, such as user identifier 1142 can also be included. The transaction record can be formatted as desired (e.g., PDF document, HTML document, or the like). Online content management service 102 can receive and process the transaction record as a receipt, in the manner described above. In some embodiments, POS system 107 can provide a paper receipt or email receipt in addition to directly uploading the receipt to online content management service 102. In some embodiments, POS system 107 can inform the user that the receipt has been uploaded to online content management service 102 (e.g., by displaying an appropriate message).

It will be appreciated that the direct uploading systems and processes described herein are illustrative and that variations and modifications are possible. Process steps described as sequential may be executed in parallel, order of steps may be varied, and steps may be modified, combined, added or omitted.

In some embodiments, a user can subscribe to direct uploading of receipts for individual merchant partners. In that case, the subscriber information provided to a particular merchant partner can be limited to information for users subscribed for that particular merchant partner. The authorization token can be a limited-access token that permits the merchant partner to upload content items but not to access or modify any stored content items.

Authorization tokens can be invalidated or regenerated by online content management service 102 with or without advance notice to merchant partners. For instance, if a user unsubscribes from the direct upload service, online content management service 102 can invalidate its copy of the user's authentication token(s) so that future attempts by merchant partners to upload receipts for the user will be rejected. As another example, if a merchant partner experiences a breach of data security, online content management service 102 can invalidate all authorization tokens that have been provided to that merchant partner. New authorization tokens can be issued if desired.

In some embodiments, the user need not take any specific action during a purchase transaction to indicate that the receipt should be uploaded to online content management service 102. For example, if the user is making an online purchase through an account established with the merchant, the merchant can maintain customer data 1140 to link the account to an authorization token and can automatically upload the receipt. In some embodiments, users subscribed to the direct-upload service can provide information to the merchant partner identifying themselves as such in a one-time event, and the merchant can store the information for subsequent use. In some embodiments, the user may be prompted during the transaction to indicate whether the receipt should be directly uploaded to the online content management service or delivered to the user via another medium (e.g., email or paper).

While the invention has been described with respect to specific embodiments, one skilled in the art will recognize that numerous modifications are possible. For example, while the foregoing description assumes that the online content management service, message management service, and POS systems are maintained by separate entities, it is possible that the same entity can provide two or more of these services or systems. Where the same entity provides two or more of the services or systems, a tight integration of user accounts can be supported. For instance, a user can establish a single account (e.g., one user ID and password) that provides access to services of both a message management service and an online content management service.

Further, while examples herein may refer specifically to "email receipts" and to email as a messaging technology, it is to be understood that other messaging technologies that allow for delivery of receipt information within a message to a user can be used in addition to or instead of email.

In addition, while various operations at the merchant side may be described as being performed by a point-of-sale system, it is to be understood that other systems operated by a merchant (e.g., back-end servers that receive information from a point-of-sale system) can also be used.

Communications between various services and systems described herein can be encrypted as desired to protect sensitive information such as authorization tokens, receipt data, and the like. In some embodiments, a virtual private network can be established between communicating systems for purposes of exchanging information.

Figure 14:
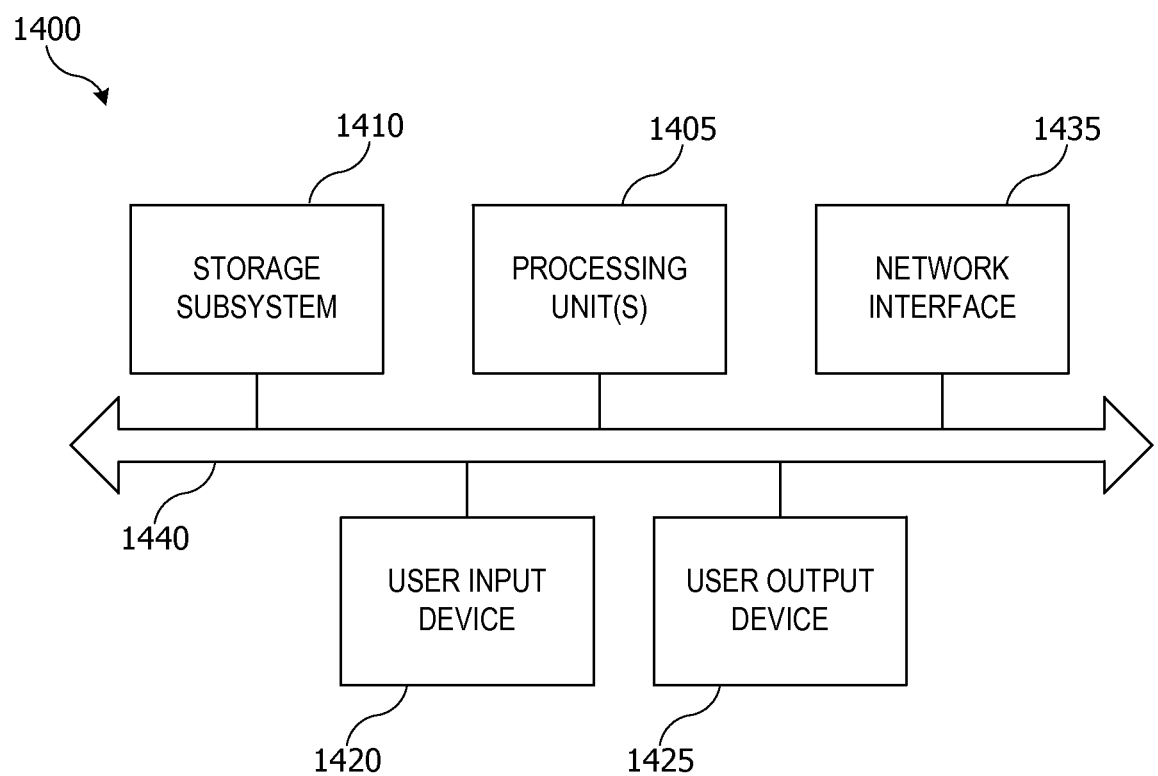
FIG. 14 shows a simplified block diagram of a representative computer system suitable for embodiments of the present invention

Various operations described herein can be implemented on computer systems, which can include systems of generally conventional design. FIG. 14 shows a simplified block diagram of a representative computer system 1400 suitable for embodiments of the present invention. In various embodiments, computer system 1400 or similar systems can implement a server system (e.g., all or part of online content management service 102, message management service 104, POS systems 106-108) or a client device (e.g., client device 112). Computer system 1400 can include processing unit(s) 1405, storage subsystem 1410, input devices 1420, output devices 1425, network interface 1435, and bus 1440.

Processing unit(s) 1405 can include a single processor, which can have one or more cores, or multiple processors. In some embodiments, processing unit(s) 1405 can include one or more general-purpose processors as well as one or more special-purpose co-processors such as graphics processors, digital signal processors, or the like. In some embodiments, some or all processing units 1405 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1405 can execute instructions stored in storage subsystem 1410.

Storage subsystem 1410 can include various memory units such as a system memory, a read-only memory (ROM), and a permanent storage device. The ROM can store static data and instructions that are needed by processing unit(s) 1405 and other modules of computer system 1400. The permanent storage device can be a read-and-write memory device. This permanent storage device can be a non-volatile memory unit that stores instructions and data even when computer system 1400 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 1405 need at runtime.

Storage subsystem 1410 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 1410 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 1410 can store one or more software programs to be executed by processing unit(s) 1405, such as an operating system, client interface programs, programs to identify and/or process receipts, client applications, and so on. "Software" refers generally to sequences of instructions that, when executed by processing unit(s) 1405, cause computer system 1400 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 1405. Software can be implemented as a single program or a collection of separate programs or program modules that interact as desired. From storage subsystem 1410, processing unit(s) 1405 can retrieve program instructions to execute and data to process in order to execute various operations described herein.

A user interface can be provided by one or more user input devices 1420 and one or more user output devices 1425. Input devices 1420 can include any device via which a user can provide signals to computer system 1400; computer system 1400 can interpret the signals as indicative of particular user requests or information. In various embodiments, input devices 1420 can include any or all of a keyboard, track pad, touch screen, mouse or other pointing device, scroll wheel, click wheel, dial, button, switch, keypad, microphone, and so on.

User output devices 1425 can include any device via which computer system 1400 can provide information to a user. For example, user output devices 1425 can include a display to display images generated by computer system 1400. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touch screen that function as both input and output device. In some embodiments, other user output devices 1425 can be provided in addition to or instead of a display. Examples include indicator lights, speakers, tactile "display" devices, printers, and so on.

In some embodiments, input device 1420 and output devices 1425 can interoperate to provide a graphical user interface ("GUI") that allows a user to interact with computer system 1400 by using an input device to select a control element displayed on the screen (e.g., by operating a pointing device such as a mouse or touching the location where a control element is displayed on a touch screen).

Network interface 1435 can provide voice and/or data communication capability for computer system 1400, including the ability to communicate with various messaging services and/or message management services to access and act upon messages. In some embodiments, network interface 1435 can include radio frequency (RF) transceiver components for accessing wireless voice and/or data networks (e.g., using cellular telephone technology; advanced data network technology such as 3G, 4G, or LTE, IEEE 802.11 family standards (e.g., Wi-Fi® standards promulgated by the Wi-Fi Alliance); Bluetooth® standards (promulgated by Bluetooth SIG); or other mobile communication technologies, or any combination thereof), GPS receiver components, and/or other components. In some embodiments, network interface 1435 can provide wired network connectivity (e.g., Ethernet) in addition to or instead of a wireless interface. Network interface 1435 can be implemented using a combination of hardware (e.g., antennas, modulators/demodulators, encoders/decoders, and other analog and/or digital signal processing circuits) and software components.

Bus 1440 can include various system, peripheral, and chipset buses that communicatively connect the numerous components of computer system 1400. For example, bus 1440 can communicatively couple processing unit(s) 1405 with storage subsystem 1410. Bus 1440 can also connect to input devices 1420 and output devices 1425. Bus 1440 can also couple computing system 1400 to a network through network interface 1435. In this manner, computer system 1400 can be a part of a network of multiple computer systems (e.g., a local area network (LAN), a wide area network (WAN), an intranet, or a network of networks, such as the Internet.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 1405 can provide various functionality for computer system 1400. For example, computer system 1400 can be used in various embodiments to execute any and all of the processes described above to identify messages that are (or include) receipts, upload receipts to an online content management service, and/or process receipts received at an online content management service.

It will be appreciated that computer system 1400 is illustrative and that variations and modifications are possible. Computer system 1400 can have other capabilities not specifically described here (e.g., mobile phone, global positioning system (GPS), power management, one or more cameras, various connection ports for connecting external devices or accessories, etc.). Computer system 1400 can also be scalable and implemented in a variety of architectures, from system-on-a-chip to server farms. Further, while computer system 1400 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

The invention claimed is:

1. A method comprising:
   obtaining, at a content management system, a first content item and metadata associated with the first content item;
   analyzing the first content item based, at least partly, on a keyword to provide a score reflecting a likelihood that the first content item is a candidate for processing as a first type of content, and adding, to the metadata of the first content item, information indicating whether the first content item is the candidate for processing as the first type of content;
   determining that the first content item is the candidate for processing as the first type of content based on the analyzing of the first content item;
   responsive to determining that the first content item is the candidate for processing as the first type of content, presenting, by a client device, a user interface including a list area presenting a list of obtained content items including the first content item, the user interface including a user-operable control element placed within the list area, the user-operable control element indicating that the first content item is the candidate for processing as the first type of content;
   detecting, by the client device, an operation of the user-operable control element to indicate that the first content item should be processed as the first type of content; and
   in response to detecting the operation of the user-operable control element, causing the first content item to be processed using a first processing operation;
   obtaining, at the client device, a second content item and metadata associated with the second content item.

2. The method of claim 1, further comprising:
   determining, by the client device, a triggering condition based on the analyzing of the metadata of the first content item, the triggering condition including a comparison of at least one content-item characteristic of the first content item with content-item characteristics of future content items;
   presenting, by the client device, a prompt to establish a rule to process the future content items based on the triggering condition; and
   in response to receiving a user input indicating that the rule should be established, sending, by the client device, a further instruction to the content management system to establish the rule.

3. The method of claim 2, further comprising:
   obtaining, at the client device, a second content item and metadata associated with the second content item;
   analyzing, by the client device, the second content item to determine how to process the second content item;
   determining, by the client device, that the second content item triggers the triggering condition; and
   based on the second content item triggering the triggering condition, causing, by the client device, the second content item to be processed using the first processing operation.

4. The method of claim 2, further comprising:
   responsive to determining that the first content item is the candidate for processing as the first type of content, adding, by the client device, to the metadata of the first content item the triggering condition and an indication that the first content item should be processed as the first type of content.

5. The method of claim 1, wherein:
   the first content item as an electronic message from a messaging service, and
   analyzing, by the client device, the metadata of the first content item to determine whether the first content item is the candidate for processing as the first type of content comprises:
   detecting a presence of keywords in a subject line, body, or attachment to the electronic message.

6. The method of claim 1, wherein:
the first content item as an electronic message from a messaging service, and
analyzing, by the client device, the metadata of the first content item to determine whether the first content item is the candidate for processing as the first type of content comprises:
identifying a sender of the electronic message; and
determining that the sender of the electronic message is associated with the first type of content.

7. The method of claim 1, wherein:
the first type of content is a receipt and the first processing operation include a receipt parsing operation.

8. A non-transitory computer readable medium comprising one or more sequences of instructions, which, when executed by a processor, causes a computing system to perform operations comprising:
obtaining a first content item and metadata associated with the first content item;
analyzing the first content item based, at least partly, on a keyword to provide a score reflecting a likelihood that the first content item is a candidate for processing as a first type of content, and adding, to the metadata of the first content item, information indicating whether the first content item is the candidate for processing as the first type of content;
determining that the first content item is the candidate for processing as the first type of content based on the analyzing of the first content item;
responsive to determining that the first content item is the candidate for processing as the first type of content, presenting a user interface including a list area presenting a list of obtained content items including the first content item, the user interface including a user-operable control element placed within the list area, the user-operable control element indicating that the first content item is the candidate for processing as the first type of content;
detecting operation of the user-operable control element to indicate that the first content item should be processed as the first type of content; and
in response to detecting the operation of the user-operable control element, sending an instruction to process the first content item using a first processing operation.

9. The non-transitory computer readable medium of claim 8, wherein the instructions further cause the computing system to perform operations comprising:
determining a triggering condition based on the analyzing of the metadata of the first content item, the triggering condition including a comparison of at least one content-item characteristic of the first content item with content-item characteristics of future content items;
presenting a prompt to establish a rule to process the future content items based on the triggering condition; and
in response to receiving a user input indicating that the rule should be established, sending a further instruction to a content management system to establish the rule.

10. The non-transitory computer readable medium of claim 9, wherein the instructions further cause the computing system to perform operations comprising:
obtaining a second content item and second metadata associated with the second content item;
analyzing the second content item to determine how to process the second content item;
determining that the second content item triggers the triggering condition; and
based on the second content item triggering the triggering condition, causing the second content item to be processed using the first processing operation.

11. The non-transitory computer readable medium of claim 9, wherein the instructions further cause the computing system to perform operations comprising:
responsive to determining that the first content item is the candidate for processing as the first type of content, adding to the metadata of the first content item the triggering condition and an indication that the first content item should be processed as the first type of content.

12. The non-transitory computer readable medium of claim 8, wherein:
the first type of content is a receipt and the first processing operation include a receipt parsing operation.

13. The non-transitory computer readable medium of claim 8, wherein:
the first content item as an electronic message from a messaging service, and
analyzing the metadata of the first content item to determine whether the first content item is the candidate for processing as the first type of content comprises:
detecting a presence of keywords in a subject line, body, or attachment to the electronic message.

14. The non-transitory computer readable medium of claim 8, wherein:
the first content item as an electronic message from a messaging service, and
analyzing the metadata of the first content item to determine whether the first content item is the candidate for processing as the first type of content comprises:
identifying a sender of the electronic message; and
determining that the sender of the electronic message is associated with the first type of content.

15. A system comprising:
one or more processors; and
a memory having programming instructions stored thereon, which, when executed by the one or more processors, causes the system to perform operations comprising:
identifying a first content item;
analyzing the first content item based, at least partly, on a keyword to provide a score reflecting a likelihood that the first content item is a candidate for processing as a first type of content;
determining that the first content item is the candidate for processing as the first type of content based on the analyzing the first content item;
responsive to determining that the first content item is the candidate for processing as the first type of content, presenting a user interface including a list area presenting a list of obtained content items including the first content item, the user interface including a user-operable control element placed within the list area, the user-operable control element indicating that the first content item is the candidate for processing as the first type of content;
detecting an operation of the user-operable control element to indicate that the first content item should be processed as the first type of content; and
in response to detecting the operation of the user-operable control element, causing the first content item to be processed using a first processing operation.

16. The system of claim 15, wherein the operations further comprise:
- determining a triggering condition based on the analyzing of the metadata of the first content item, the triggering condition including a comparison of at least one content-item characteristic of the first content item with content-item characteristics of future content items;
- presenting a prompt to establish a rule to process the future content items based on the triggering condition; and
- in response to receiving a user input indicating that the rule should be established, sending a further instruction to a content management system to establish the rule.

17. The system of claim 16, wherein the operations further comprise:
- identifying a second content item;
- analyzing the second content item to determine how to process the second content item;
- determining that the second content item triggers the triggering condition; and
- based on the second content item triggering the triggering condition, causing the second content item to be processed using the first processing operation.

18. The system of claim 15, wherein:
the first type of content is a receipt and the first processing operation include a receipt parsing operation.

19. The system of claim 15, wherein:
the first content item as an electronic message from a messaging service, and
analyzing the first content item to determine whether the first content item is the candidate for processing as the first type of content comprises:
detecting a presence of keywords in a subject line, body, or attachment to the electronic message.

20. The system of claim 15, wherein:
the first content item as an electronic message from a messaging service, and
analyzing the first content item to determine whether the first content item is the candidate for processing as the first type of content comprises:
identifying a sender of the electronic message; and
determining that the sender of the electronic message is associated with the first type of content.

* * * * *